US012071286B1

(12) United States Patent
Hoffman

(10) Patent No.: US 12,071,286 B1
(45) Date of Patent: Aug. 27, 2024

(54) CAP ASSEMBLY FOR A MEDICATION CONTAINER

(71) Applicant: Express Scripts Strategic Development, Inc., St. Louis, MO (US)

(72) Inventor: Robert E. Hoffman, Linden, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 1012 days.

(21) Appl. No.: 16/927,420

(22) Filed: Jul. 13, 2020

Related U.S. Application Data

(60) Provisional application No. 62/903,554, filed on Sep. 20, 2019, provisional application No. 62/872,733, filed on Jul. 11, 2019.

(51) Int. Cl.
*A61J 7/02* (2006.01)
*B65D 51/24* (2006.01)
*B65D 83/04* (2006.01)

(52) U.S. Cl.
CPC .............. *B65D 51/248* (2013.01); *A61J 7/02* (2013.01); *B65D 83/0481* (2013.01); *B65D 2203/10* (2013.01); *B65D 2583/04* (2013.01)

(58) Field of Classification Search
CPC .................................................. B65D 83/0481
See application file for complete search history.

(56) References Cited

U.S. PATENT DOCUMENTS 3,437,236 A 4/1969 Huck
3,823,844 A 7/1974 Linkemer
3,874,564 A 4/1975 Huneke
4,034,757 A 7/1977 Glover
4,288,006 A 9/1981 Clover, Jr.
4,308,979 A 1/1982 Otterson
4,377,236 A 3/1983 Montgomery
4,432,300 A 2/1984 Lyss
4,460,106 A 7/1984 Moulding, Jr.
4,489,834 A 12/1984 Thackrey
4,530,447 A 7/1985 Greenspan
4,541,541 A 9/1985 Hickman
(Continued)

FOREIGN PATENT DOCUMENTS

EP 02524321 A 1/1988
EP 3762881 A1 1/2021
(Continued)

*Primary Examiner* — Gene O Crawford
*Assistant Examiner* — Ayodeji T Ojofeitimi
(74) *Attorney, Agent, or Firm* — Dickinson Wright PLLC

(57) ABSTRACT

The medication container includes a receptacle that has an inner space for holding medications. The cap assembly is coupled with the receptacle for retaining the medications in the inner space. The cap assembly includes at least one passage that can be selectively opened and closed and includes at least one medication sensor that is configured to detect any medications travelling through the passage and out of the receptacle in a contactless manner. A microprocessor is in electrical communication with the at least one medication sensor and with a memory. The microprocessor is configured to record data to the memory in response to the at least one medication sensor detecting a medication travelling through the passage. A wireless module is in electrical communication with the microprocessor for uploading the data to an external device.

20 Claims, 16 Drawing Sheets

(56) References Cited

U.S. PATENT DOCUMENTS

| | | | | |
|---|---|---|---|---|
| 4,567,995 | A | 2/1986 | Kreiseder | |
| 4,611,725 | A | 9/1986 | Kacalieff | |
| 4,971,221 | A | 11/1990 | Urquhart | |
| 5,000,345 | A * | 3/1991 | Brogna | G07F 13/10 |
| | | | | 141/141 |
| 5,176,277 | A | 1/1993 | Schuermann | |
| 5,193,704 | A | 3/1993 | Kick | |
| RE34,263 | E | 5/1993 | VanKerkhoven | |
| 5,213,238 | A | 5/1993 | Martin | |
| 5,259,532 | A | 11/1993 | Schwarzli | |
| 5,269,432 | A | 12/1993 | Beckertgis | |
| 5,383,582 | A | 1/1995 | Baxter | |
| 5,407,107 | A | 4/1995 | Smith | |
| 5,421,472 | A | 6/1995 | Beckertgis | |
| 5,542,579 | A | 8/1996 | Robbins, III | |
| 5,549,217 | A | 8/1996 | Benarrouch | |
| 5,601,213 | A | 2/1997 | Daniello | |
| 5,850,919 | A | 12/1998 | Freed | |
| 5,921,394 | A | 7/1999 | Shroff | |
| 6,098,835 | A | 8/2000 | Dejonge | |
| 6,142,337 | A | 11/2000 | Schreckenberg | |
| 6,259,654 | B1 | 7/2001 | De La Huerga | |
| 6,332,100 | B1 | 12/2001 | Sahai | |
| 6,343,711 | B1 | 2/2002 | Coughlin | |
| 6,401,429 | B2 | 6/2002 | Aylward | |
| 6,651,840 | B1 | 11/2003 | Van Dullemen | |
| 6,655,707 | B2 | 12/2003 | Buckmiller | |
| 6,860,403 | B1 | 3/2005 | Mehrens | |
| 7,100,797 | B2 | 9/2006 | Kahn | |
| 7,213,721 | B2 | 5/2007 | Abdulhay | |
| 7,240,795 | B2 * | 7/2007 | Lee | B65D 25/04 |
| | | | | 206/534 |
| 7,377,401 | B2 | 5/2008 | Humphrey | |
| 7,711,449 | B2 | 5/2010 | Abdulhay | |
| 7,748,569 | B2 | 7/2010 | Sunatori | |
| 7,909,212 | B2 | 3/2011 | Parve | |
| 7,967,160 | B2 | 6/2011 | Rault | |
| 8,269,613 | B2 | 9/2012 | Lazar | |
| 8,386,275 | B2 | 2/2013 | Chambers | |
| 8,388,907 | B2 | 3/2013 | Gold | |
| 8,666,539 | B2 | 3/2014 | Ervin | |
| 8,666,543 | B2 | 3/2014 | Macvittie | |
| 8,813,987 | B2 | 8/2014 | Oelz | |
| 8,857,638 | B2 | 10/2014 | Brozell | |
| 8,955,058 | B2 | 2/2015 | Castro | |
| D723,793 | S | 3/2015 | Macvittie | |
| 9,021,981 | B2 | 5/2015 | Raiti De Boyles | |
| 9,195,822 | B2 | 11/2015 | Carlson | |
| 9,283,150 | B2 | 3/2016 | Bujalski | |
| D756,681 | S | 5/2016 | Macvittie | |
| 9,492,357 | B2 | 11/2016 | Macvittie | |
| 9,497,178 | B2 | 11/2016 | Chow | |
| 9,511,003 | B2 | 12/2016 | Medrano | |
| 9,516,008 | B2 | 12/2016 | Chow | |
| 9,554,969 | B2 | 1/2017 | Lehmann | |
| 9,622,939 | B2 | 4/2017 | Buxton-Dakides | |
| 9,713,574 | B2 | 7/2017 | Carrel | |
| 9,730,860 | B2 | 8/2017 | Hamilton | |
| 9,731,103 | B1 | 8/2017 | Rouse | |
| 9,757,305 | B2 | 9/2017 | Ika | |
| 9,775,780 | B2 | 10/2017 | Afsarifard | |
| 9,872,808 | B2 | 1/2018 | Gipson | |
| 9,934,365 | B2 | 4/2018 | Turnell | |
| 9,981,116 | B1 | 5/2018 | Rouse | |
| 10,073,954 | B2 | 9/2018 | Chen | |
| 10,093,474 | B2 | 10/2018 | Littman | |
| 10,188,840 | B2 | 1/2019 | Rouse | |
| 10,196,197 | B2 | 2/2019 | Yeo | |
| 10,392,181 | B2 | 8/2019 | Zonana | |
| 10,399,725 | B2 | 9/2019 | Paz | |
| 10,441,509 | B2 | 10/2019 | Rouse | |
| 10,468,132 | B2 | 11/2019 | Kamen | |
| 10,494,165 | B2 | 12/2019 | Sterns | |
| 10,555,873 | B2 | 2/2020 | Poirier | |
| 10,621,880 | B2 | 4/2020 | Boguraev | |
| 10,675,216 | B2 | 6/2020 | Mejia | |
| 10,722,431 | B2 | 7/2020 | Chen | |
| 10,729,860 | B1 | 8/2020 | Boyer | |
| 10,792,226 | B2 | 10/2020 | Rouse | |
| 10,894,001 | B2 | 1/2021 | Jarvis | |
| 10,964,154 | B2 | 3/2021 | Einav | |
| 11,157,601 | B2 | 10/2021 | Miu | |
| 11,576,842 | B2 | 2/2023 | Park | |
| 2005/0269348 | A1 | 12/2005 | Limback | |
| 2006/0124502 | A1 | 6/2006 | Lee | |
| 2006/0213917 | A1 | 9/2006 | Handfield | |
| 2007/0007301 | A1 | 1/2007 | Kaplan | |
| 2008/0245810 | A1 * | 10/2008 | Karwacki, Jr. | G07F 17/0092 |
| | | | | 221/13 |
| 2010/0147732 | A1 | 6/2010 | Delagrange | |
| 2010/0200593 | A1 | 8/2010 | Lazar | |
| 2011/0301747 | A1 | 12/2011 | Chambers | |
| 2012/0203376 | A1 * | 8/2012 | Savage | G06Q 10/087 |
| | | | | 700/214 |
| 2012/0257478 | A1 | 10/2012 | Marcellino | |
| 2013/0035785 | A1 | 2/2013 | Macvittie | |
| 2013/0116818 | A1 * | 5/2013 | Hamilton | A61J 7/04 |
| | | | | 221/277 |
| 2013/0161207 | A1 | 6/2013 | Luciano, Jr. | |
| 2014/0305963 | A1 | 10/2014 | Zonana | |
| 2014/0343734 | A1 * | 11/2014 | Meyer | G05B 15/02 |
| | | | | 700/282 |
| 2015/0053801 | A1 | 2/2015 | Smit | |
| 2015/0129602 | A1 | 5/2015 | Medrano | |
| 2015/0291344 | A1 | 10/2015 | Macvittie | |
| 2015/0342830 | A1 | 12/2015 | Bujalski | |
| 2015/0360834 | A1 | 12/2015 | Mikhail | |
| 2016/0015885 | A1 | 1/2016 | Pananen | |
| 2016/0058670 | A1 | 3/2016 | Wheeler | |
| 2016/0107820 | A1 | 4/2016 | Macvittie | |
| 2016/0120758 | A1 | 5/2016 | Pi | |
| 2016/0147976 | A1 | 5/2016 | Jain | |
| 2016/0158470 | A1 | 6/2016 | Esteve | |
| 2016/0309967 | A1 * | 10/2016 | Pelfrey | A47K 5/1217 |
| 2016/0367188 | A1 | 12/2016 | Malik | |
| 2017/0079886 | A1 | 3/2017 | Sagynaliev | |
| 2017/0281471 | A1 | 10/2017 | Hamilton | |
| 2017/0296432 | A1 | 10/2017 | Ika | |
| 2017/0334631 | A1 | 11/2017 | Veltri | |
| 2018/0015002 | A1 | 1/2018 | Alaev | |
| 2019/0130078 | A1 | 5/2019 | Herbert | |
| 2019/0133888 | A1 | 5/2019 | Lam | |
| 2019/0156475 | A1 | 5/2019 | Markson | |
| 2019/0185249 | A1 | 6/2019 | Bartley | |
| 2019/0223792 | A1 | 7/2019 | Dhar | |
| 2020/0252395 | A1 | 8/2020 | Mercier | |

FOREIGN PATENT DOCUMENTS

| | | | |
|---|---|---|---|
| WO | 20041038561 | W | 12/2004 |
| WO | 2015157759 | A1 | 10/2015 |
| WO | 2016061462 | A2 | 4/2016 |
| WO | 2016127051 | A1 | 8/2016 |

* cited by examiner

CAP ASSEMBLY FOR A MEDICATION CONTAINER

CROSS-REFERENCE TO RELATED APPLICATIONS

This application claims priority to U.S. Provisional Application No. 62/872,733, filed on Jul. 11, 2019, and entitled "CAP ASSEMBLY FOR A MULTI-CHAMBER MEDICATION CONTAINER" and U.S. Provisional Application No. 62/903,554, filed on Sep. 20, 2019, and entitled "CAP ASSEMBLY FOR A MULTI-CHAMBER MEDICATION CONTAINER", the entire contents of these applications being herein incorporated by reference.

FIELD OF THE INVENTION

The subject invention is generally related to medication containers and, more particularly, to a cap assembly for a medication container.

BACKGROUND

Medication compliance by patients is a known problem in the medical industry because patients often, either intentionally or accidentally, fail to follow a medication regimen prescribed by a medical provider. In some cases, as little as a single missed dose may require a patient to restart a medication regimen from the beginning. One known product which seeks to improve medication compliance, includes a plurality of packets, each of which contains only the medications that the user has to take at a certain time. In other words, the pills are divided, not by type, but by when they should be taken. However, there remains a continuing need for a product that is can improve medication compliance and which is both more convenient and less costly than other known solutions.

SUMMARY OF THE INVENTION

One aspect of the present disclosure is related to a medication container that includes a receptacle that has an inner space for holding medications. The cap assembly is coupled with the receptacle for retaining the medications in the inner space. The cap assembly includes at least one passage that can be selectively opened and closed. The cap assembly includes at least one medication sensor that is configured to detect any medications travelling through the passage and out of the receptacle in a contactless manner. A microprocessor or other electronic controller is in electrical communication with the at least one medication sensor and with a memory. The microprocessor is configured to record data to the memory in response to the at least one medication sensor detecting a medication travelling through the passage. A wireless module is in electrical communication with the microprocessor for uploading the data to an external device.

According to yet another aspect of the present disclosure, the at least one medication sensor includes a light source and a light detector. In an example embodiment, the medication sensor includes a transceiver.

According to still another aspect of the present disclosure, the light detector is configured to produce a voltage or other signal when exposed to light. In an example embodiment, the microprocessor is configured to monitor the voltage produced by the light detector or another output signal from the detector to determine when a medication travels through the passage.

According to a further aspect of the present disclosure, the cap assembly further includes a gate, which is configured to be moved between an open position and a closed position at the passage.

According to yet a further aspect of the present disclosure, the wireless module is configured to communicate with the external device over cellular communication channels.

Another aspect of the present disclosure is related to a medication container including a receptacle that has an inner space (defined by an outer wall) that is divided into at least two chambers for holding different medications. A cap assembly is operably coupled with the receptacle for retaining the medications in the at least two chambers. The cap assembly further includes at least one passage that can be selectively opened for allowing the medications in the at least two chambers to exit the receptacle and can be closed. The cap assembly further includes at least one medication sensor that is configured to detect any medications travelling through the passage and out of the receptacle. The sensor can detect passage in a contactless manner. A microprocessor is in electrical communication with the at least one medication sensor and with a memory. The microprocessor is configured to record data to the memory in response to the at least one medication sensor detecting a medication travelling through the at least one passage. The data includes at least a time stamp and an identification of which chamber of the at least two chambers the medication was located in. The cap assembly further includes a wireless module that is in electrical communication with the microprocessor for uploading the data to an external device.

According to another aspect of the present disclosure, the at least one passage of the cap assembly is only a single passage, and the cap assembly is rotatable relative to the receptacle for allowing a user to selectively align the passage with a desired one of the at least two chambers of the receptacle.

According to yet another aspect of the present disclosure, the cap assembly further includes a position sensor which is configured to detect which one of the at least two chambers of the receptacle is a selected chamber with which the passage is aligned. In an example embodiment, the position sensor is in electrical communication with the microprocessor.

According to still another aspect of the present disclosure, the data recorded by the microprocessor to the memory further includes which chamber of the receptacle was the selected chamber when the at least one medication sensor detected the medication travelling through the passage.

According to a further aspect of the present disclosure, the at least one medication sensor is a photoreflective sensor. In an example, a wall of the passage is configured to reflect at least a portion of the light in the passage.

According to yet a further aspect of the present disclosure, the at least one medication sensor is a diffuse sensor.

According to still a further aspect of the present disclosure, the cap assembly further includes at least one gate for selectively opening and closing the at least one passage and further includes at least one gate sensor which is configured to detect if the gate is in an open position or a closed position.

According to another aspect of the present disclosure, the cap assembly further includes an attachment sensor, which is able to confirm attachment of the cap assembly with the receptacle.

Another aspect of the present disclosure is related to a medication container, which includes a receptacle that has an inner space for holding medications. A cap assembly is operably coupled with the inner space for retaining the medications in the inner space. The cap assembly further includes at least one passage that can be selectively opened and closed. At least one medication sensor is disposed in the cap assembly and is configured to detect any medications travelling through the passage and out of the receptacle. The at least one medication sensor is also able to operate in either an active mode or a low power mode. A movement sensor is disposed in the cap assembly and is configured to detect movement of the medication container. A microprocessor is in electrical communication with the at least one medication sensor and with the movement sensor. The microprocessor is configured to operate the at least one medication sensor in a low power mode and to activate the at least one medication sensor in the active mode in response to the movement sensor detecting movement of the medication container.

According to another aspect of the present disclosure, the movement sensor is an accelerometer.

According to yet another aspect of the present disclosure, the cap assembly further includes a memory, and the microprocessor is configured to record data to the memory in response to the at least one medication sensor detecting a medication travelling through the at least one passage. The data includes at least a time stamp and a count of the number of medications that travelled through the at least one passage during a dispensing event.

According to still another aspect of the present disclosure, the cap assembly further includes a wireless module, which is configured to communicate the data to an external device.

According to a further aspect of the present disclosure, the at least one medication sensor includes a light sensor and a light detector.

BRIEF DESCRIPTION OF THE DRAWINGS

Other advantages of the present disclosure will be readily appreciated, as the same becomes better understood by reference to the following detailed description when considered in connection with the accompanying drawings wherein.

DESCRIPTION OF THE ENABLING EMBODIMENT

Figure 1:
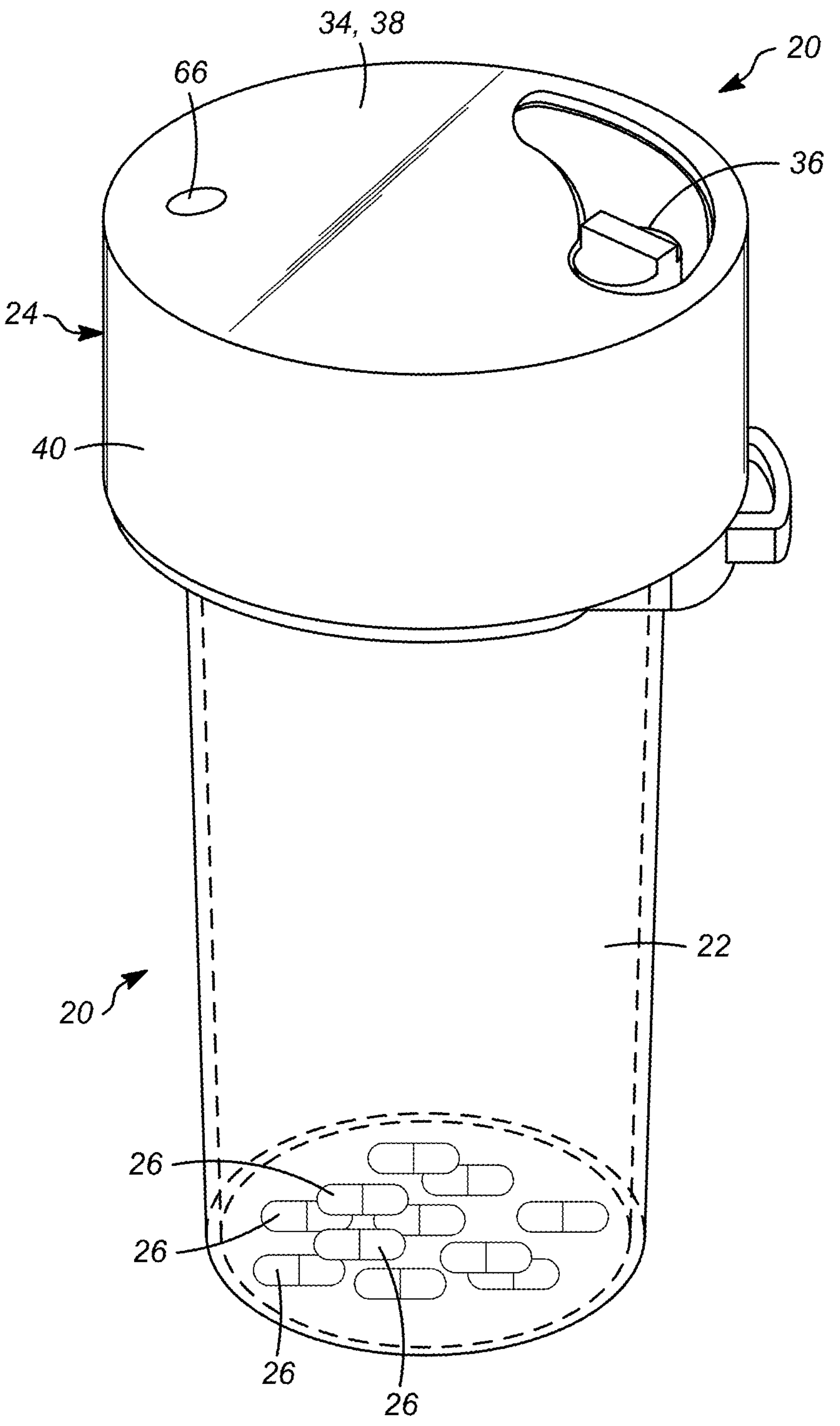
FIG. 1 is a perspective view of a first embodiment of a medication container constructed according to one aspect of the present disclosure.
Figure 2:
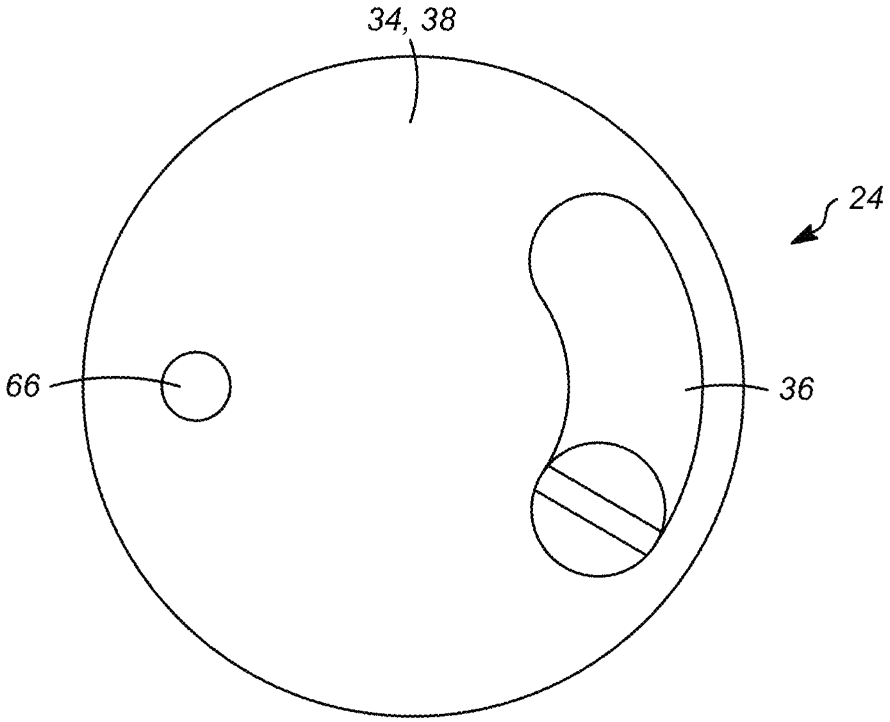
FIG. 2 is a top elevation view of the medication container of FIG. 1.
Figure 3:
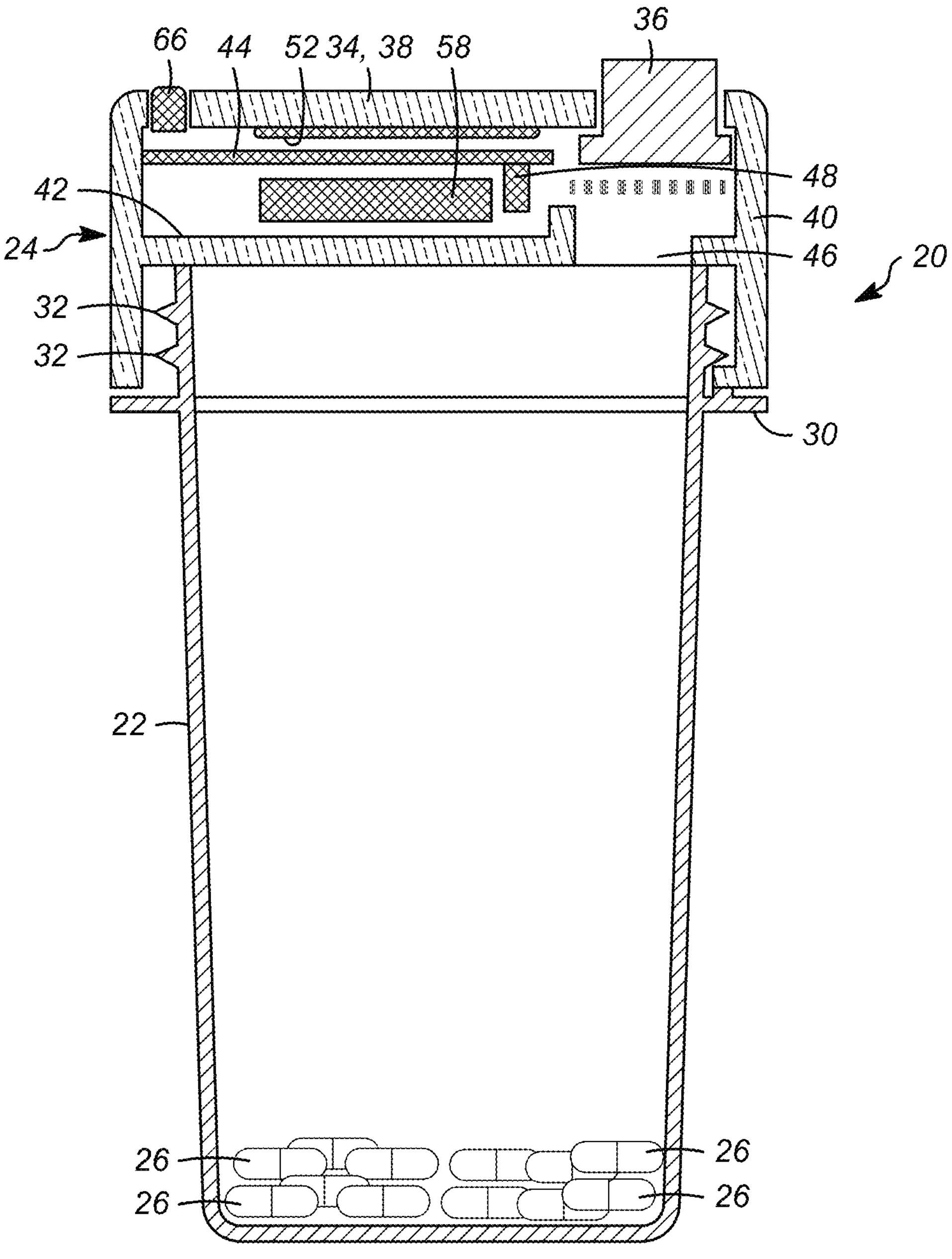
FIG. 3 is a cross-sectional view of the medication container of FIG. 1.
Figure 7:
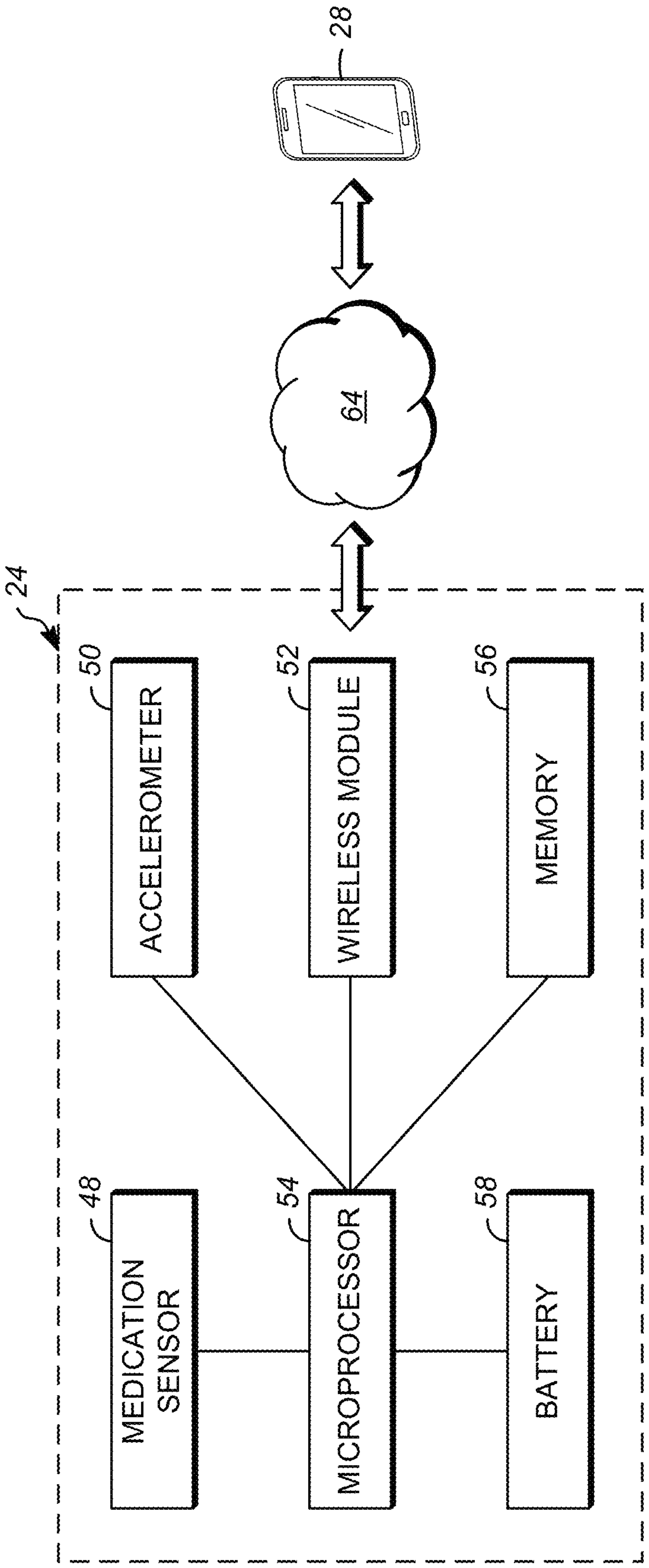
FIG. 7 is a schematic view showing a cap assembly in electrical communication with an external device.

Referring to the Figures, wherein like numerals indicate corresponding parts throughout the several views, a first embodiment of an improved medication container 20 is generally shown in FIG. 1-3. As discussed in further detail below, the medication container 20 is a low-cost and highly effective approach to improving a user's compliance of a medication schedule. The medication container 20 includes a receptacle 22 and a cap assembly 24, which is configured both to monitor the passage of medications 26 out of the receptacle 22 and to wirelessly transmit information pertaining to each dispensing event to at least one external device 28 (shown in FIG. 7), such as a computing device, e.g., a smart phone, a computer, a server or the like. The transmission of data relating to dispensing can be sent wirelessly. The external device 28 may be controlled either by the patient, by a medical provider, a pharmacy, a pharmacy benefit provider, or combinations thereof. The external device can include a display to display for its user an easy to access log of all dispensing events, including time stamps and quantities of medications 26 dispensed or graphics related to medication dispensed from the receptacle 22. The graphics can be triggered by a flag value stored in memory for the prescribed dosing regimen for the patient and the medication 26. Thus, the medication container 20 improves medication compliance (e.g., adherence) by helping the user avoid either missing medications 26, taking medication at the wrong time, or taking double doses of medication 26. In an embodiment where a medical provider is provided with access to the log of dispensing events, the medical provider may be able to better diagnose or otherwise treat a patient's illness with the full knowledge of how well that patient is conforming to his or her medication schedule. The medications 26 could be any suitable types of solid medications (e.g., pills, capsules, tablets, etc.) or medications in individual dosing units.

As shown in FIGS. 1 and 3, the receptacle 22 is cup-shaped and has a single inner space (storage void) which extends from a closed end (sometimes referred to as the bottom) to an open end (sometimes referred to as the top). An outer wall extends upwardly from the closed end and defines the inner volume that defines the inner space. Adjacent the open end of the inner space, an outer surface of the receptacle 22 defines a radially outwardly extending flange 30 (sometimes also known as a bead) and a pair of circumferential ribs 32, which are configured to engage with the cap assembly 24 to retain the cap assembly 24 on the receptacle 22. The ribs 32 can be a continuous thread that extends twice around the circumference of the top of the receptacle wall. In the exemplary embodiment, the receptacle 22 is in the form of a vial, which allows for improved efficiency when initially filling the receptacle 22 with medications. However, in alternate embodiments, the receptacle 22 could be a bottle. The receptacle 22 is preferably made of a monolithic piece of a durable plastic material and may be shaped through an injection molding operation, for example. An outer surface of the receptacle 22 may include indicia (such as on a label) which identifies the type of medications contained in the receptacle 22 and dosage instructions. The label may contain instructions on how to use the cap assembly 24 to dispense medication without removing the cap assembly from the receptacle 22. The label can include a machine-readable code to direct a user's electronic device to instructions for using the cap assembly 24 and linking the cap assembly 24 to the user's account.

In a first exemplary embodiment, the cap assembly 24 includes a cap 34; a gate 36; and a plurality of electrical components (discussed in further detail below) for monitoring the passage of the medications 26 into and out of the receptacle 22. The cap 34 has a generally planar or slightly curved top (outer) wall 38 and a cylindrically-shaped outer wall 40 that is in a snap-fitting engagement with the ribs 32 of the receptacle 22 to retain the cap assembly 24 on the receptacle 22. The exemplary cap 34 preferably has a diameter of forty-five millimeters (45 mm) and preferably has an environmental seal, which is sealed against the receptacle 22 to retard entry of moisture, light, and air from entering the inner space of the receptacle 22. The cap 34 could have different sizes, such as thirty-eight millimeters (38 mm). In other embodiments, the cap 34 could be threadedly engaged with the receptacle 22 or could be lockingly secured with the receptacle 22 through other suitable means. The cap 34 is preferably made of polymer, e.g., plastic, and can be shaped through an injection molding operation. In other embodiments, the cap may be threaded into engagement with the receptacle or may be snap fit directly onto the flange.

As shown in FIG. 3, the cap 34 further includes an inner wall 42, which is spaced from and parallel with the top wall 38 to define a chamber within the cap 34. In an exemplary embodiment, the inner wall 42 is monolithic with the planar top surface and the cylindrical outer wall of the cap 34. An electronics substrate 44, such as a printed circuit board (PCB), which contains the aforementioned electrical components, is disposed within the chamber fixedly attached with the cap 34. In one embodiment, the electronics substrate 44 is formed within the inner wall 42. In some embodiments, the inner wall is made as a separate piece from the remainder of the cap and is sealed against the cap to assist in preventing dust and the like from entering the chamber with the electronics substrate. In some embodiments, the electronic components can be snapped into the cap as a pre-assembled unit and then electrically connected with the electronics substrate 44. In other embodiments, the electronics substrate itself serves as the inner wall and is sealed against the cylindrical outer wall of the cap.

The top wall 38 and the inner wall 42 of the cap 34 have aligned openings to define a single passage 46 for guiding the medications in the receptacle 22 through the cap assembly 24 and out of the medication container 20. In an example embodiment, the passage 46 has an annulus sector shape. In some embodiments, the passage has other shapes, e.g., a circular shape, an elliptical shape, a rectangular shape, etc.

Figure 4:
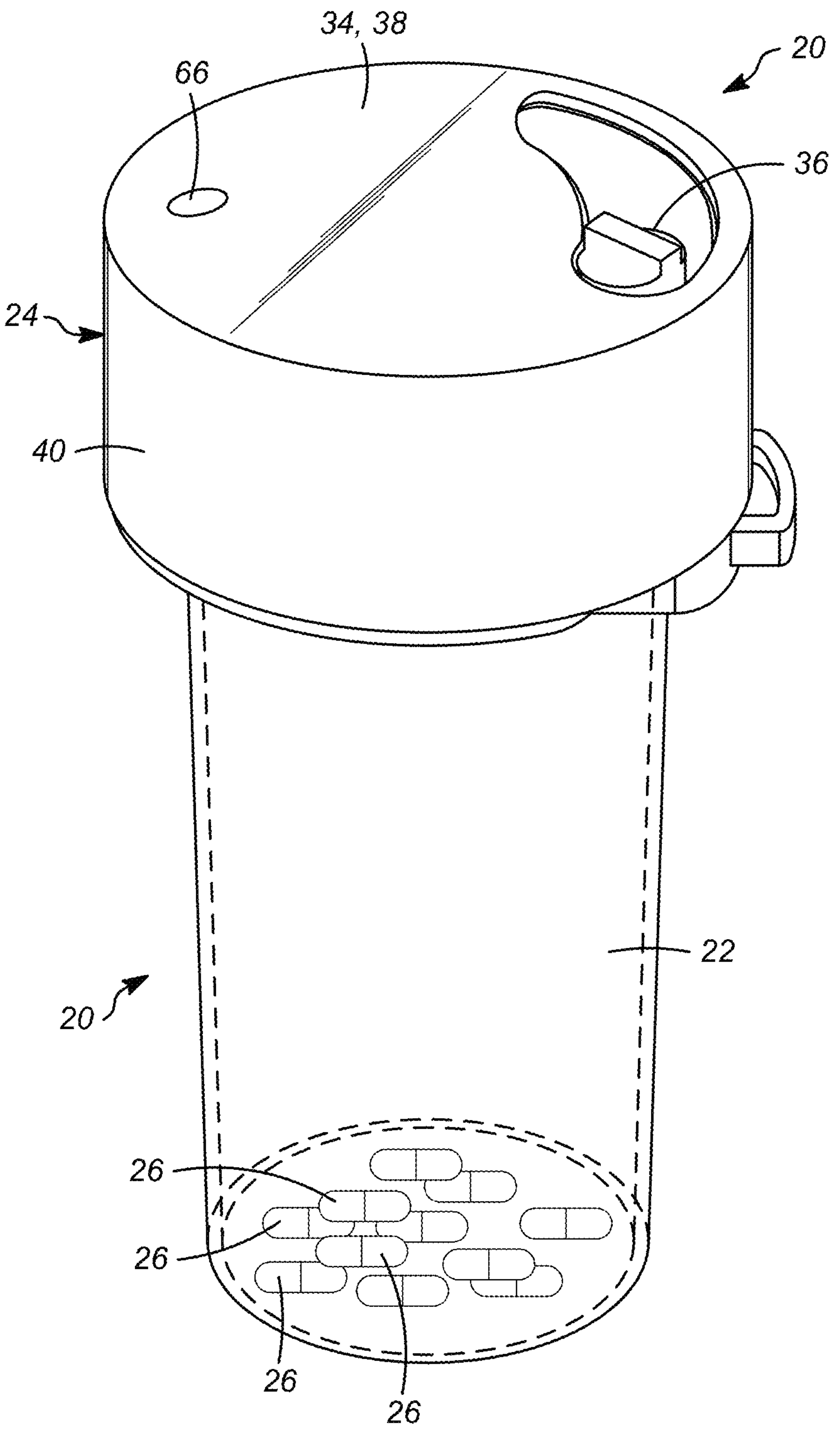
FIG. 4 is a perspective view of the medication container of FIG. 1 and showing a gate of a cap assembly in an open position.

The gate 36 is slidably attached with the cap 34 and is movable from an open position (shown in FIG. 4) to a closed position (shown in FIG. 1), and vice versa. When the gate 36 is in the open position, the medication in the receptacle 22 can freely travel through the passage 46 into or out of receptacle 22. On the other hand, when the gate 36 is in the closed position, the passage 46 is closed and medication cannot get into or out of the receptacle 22. In an example embodiment, the gate 36 has a lip which projects above the top wall 38 of the cap 34 so that a user can manually engage the gate 36 and slide the gate 36 between the open and closed positions. The manual control of the gate 36 allows a user to still access the medications contained in the receptacle 22 even in the event of a failure of the electrical components of the cap assembly 24. In some embodiments, the gate may be electronically, rather than manually, opened and closed. For example, an electrical motor or solenoid, powered from an electrical power source, can operate the gate to move it from a closed position to an open position. In one embodiment, the gate 36 is limited to only open by a certain amount based on a size of the medication 26 contained in the receptacle 22 to limit the rate that medications 26 can be dispensed. In other words, for medication containers 20 containing larger medications 26, the gate 36 can open more than in medication containers 20 containing smaller medications 26.

In an example embodiment, the electrical components include a plurality of medication sensors 48 (in some embodiments, only a single medication sensor may be included), an accelerometer 50, a wireless module 52, a microprocessor 54, a memory 56, and a battery 58. These different electrical components could be separate from or packaged along with one another. The medication sensors 48 are located adjacent to the passage 46 for detecting medications 26 traveling either into or out of the selected chamber 24 in a contactless manner, i.e., the medications 26 do not have to touch the medication sensors 48 for the medication sensors 48 to be triggered and for the cap assembly 24 to register the event as a dispensing event. Thus, the medication sensors 48 do not include any moving parts that require contact from the medication 26 to count dispensing of the medication 26. In some embodiments, the inner wall 42 may be removable or may be able to open or close in order to allow the battery 58 to be replaced when depleted.

Figure 5:
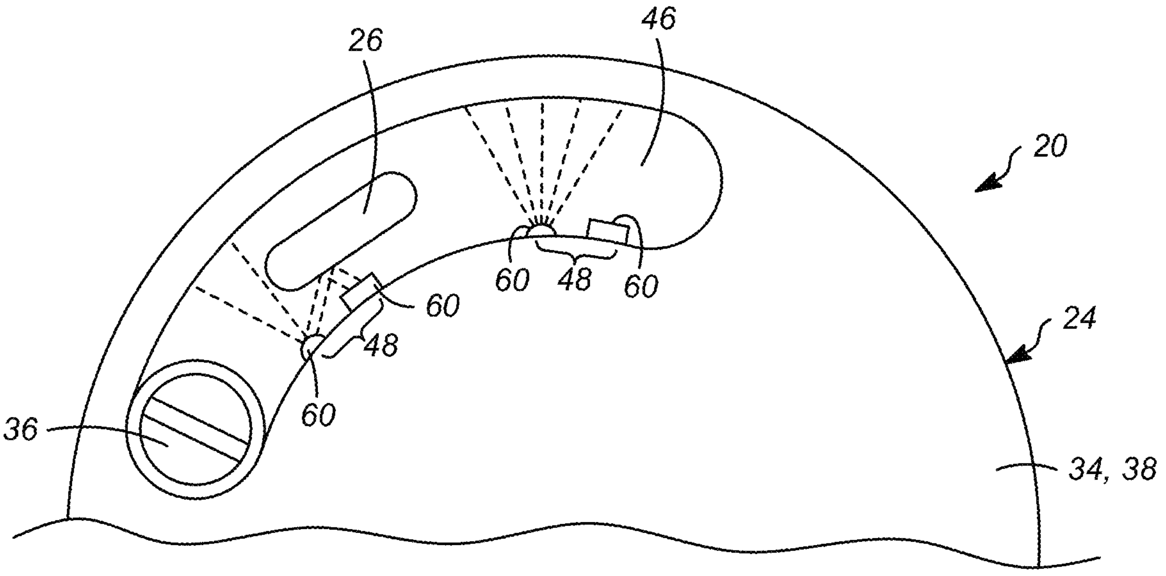
FIG. 5 is an enlarged and fragmentary view of the cap assembly and showing a medication being dispensed out of the medication container of FIG. 1.

In one embodiment, each medication sensor 48 includes an emitter, e.g., a light source 60, and a detector 62 for detecting reflected light from the light source 60. The light source 60 is a light emitting diode (LED), which is configured to emit light in the infrared wavelength band, in an example embodiment. In an example embodiment, the wavelength of light emitted from the light source 60 is greater than 622 nm. However, other types of light sources may alternately be employed. As shown in FIG. 5, each light source 60 is directed to project light in a direction towards an opposite wall of the passage 46, e.g., through a lens or collimator, which can be mounted to an inwardly, opening in facing wall of the cap. Each light detector 62 can be a photodiode, which responds to a change in light, such as by generating a voltage or another signal, when light is projected on a surface of the photodiode. The light detector 62 can communicate this voltage (or other signal) to the microprocessor 54. Depending on the type of medication 26 (specifically, its color, reflectivity, and transparency) contained in the receptacle 22, the opposite wall of the passage 46 may be white, black, reflective, or colored such that the light detectors 62 generate a baseline voltage when the passage 46 is empty. In an example embodiment, the detector 62 is paired with the emitter such that is detects a reflected, return signal sent from the emitter, which can change when a medication, e.g., a pill, is passing through the passage 46.

Figure 6A:
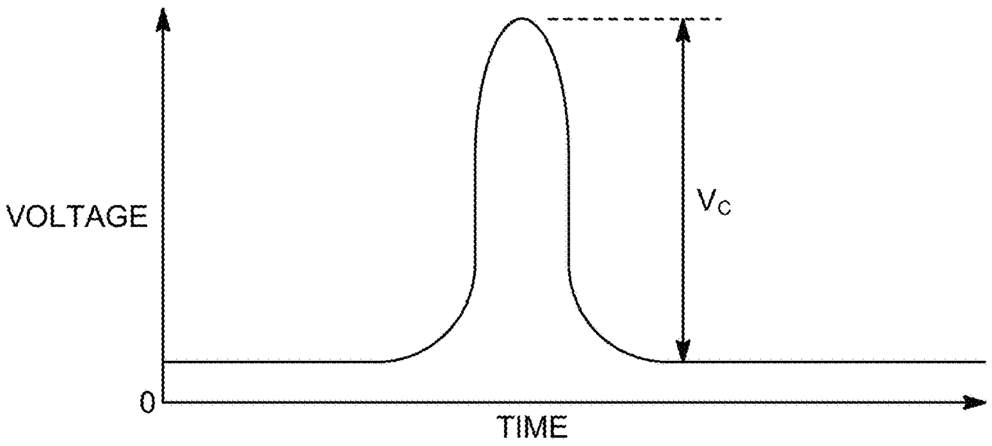
FIG. 6A is a plot showing the voltage produced by a light detector in the cap assembly of FIG. 5 as a medication is dispensed therefrom.
Figure 6B:
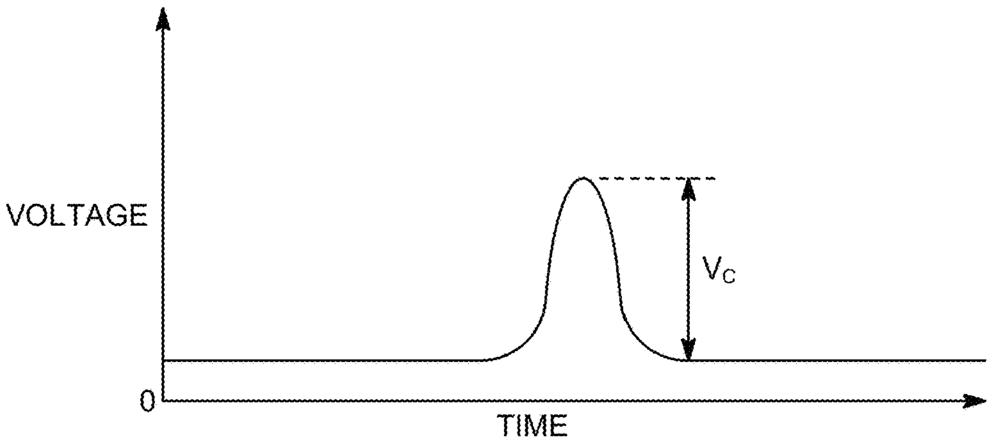
FIG. 6B is a plot showing the voltage produced by a light detector in the cap assembly of FIG. 5 as a different medication is dispensed therefrom than the medication dispensed in FIG. 6A.
Figure 6C:
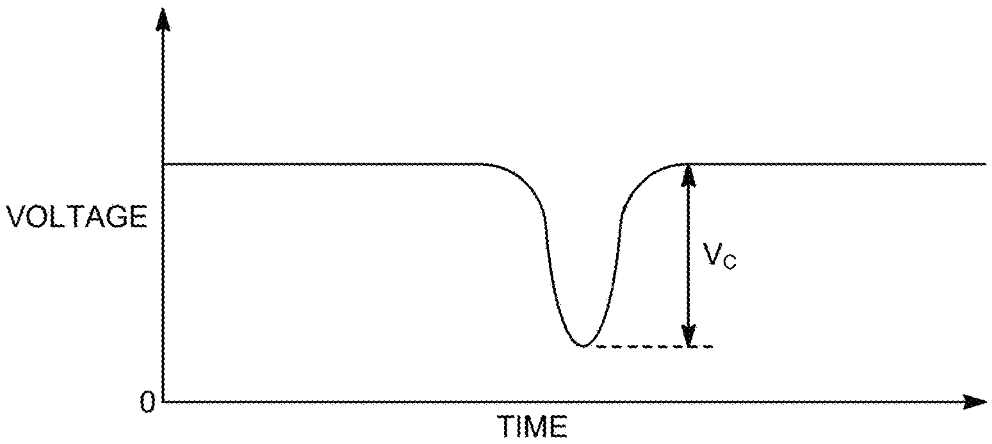
FIG. 6C is a plot showing the voltage produced by a light detector in the cap assembly of FIG. 5 as a different medication is dispensed therefrom than the medications dispensed in FIGS. 6A and 6B.

In operation, when a medication 26 travels through the passage 46 either into or out of the medication container 20, some of the light emitted by one of the light sources 60 reflects off of the medication 26 and is received by one of the light detectors 62, thereby changing the voltage produced by that light detector 62. The magnitude of this voltage change $V_C$ will depend, inter alia, on the baseline voltage when the passage 46 is empty and the color and reflectivity of the medication 26. The microprocessor 54 is pre-programmed to recognize the certain voltage changes as being associated with the medications 26 located in the container and to program into the memory 56 data associated with each event in which that voltage change $V_C$ is detected. For example, FIG. 6A depicts the voltage output by a light detector 62 wherein the opposite wall of the passage 46 (shown in FIG. 5) has a reflective coating and wherein the medication 26 (also shown in FIG. 5) has a white color. In an embodiment, the microprocessor 54 may be configured to recognize a voltage change $V_C$ of 325±25 mV as being associated with this medication 26. In another example, FIG. 6B depicts the voltage value output by the same light detector 62 when a differently colored medication 26 passes through the same passage 46. The microprocessor 54 may be configured to recognize a voltage change $V_C$ of 250±25 mV as being associated with this type of medication 26. In other embodiments, the voltage change $V_C$ may be a negative value, i.e., the voltage at the light detector 62 decreases when the medication 26 passes travels through the passage 46. For example, FIG. 6C depicts the voltage value output by the same light detector 62 when a black colored pill passes through the same passage 46. In this embodiment, the microprocessor 54 may be configured to recognize a voltage change $V_C$ of −175±25 mV as being associated with this medication 26. In either scenario where the voltage change $V_C$ is either positive or negative, the microprocessor 54 interprets such an event as a positive confirmation that a medication 26 has passed into or out of the receptacle 22 (depending on an orientation of the medication container 20, as discussed in further detail below).

The data that is saved into the memory 56 preferably includes a time stamp and a quantity of medications 26 detected and dispensed out of the passage 46. Other data that may be saved into the memory includes a temperature at the time of dispensing (if the cap assembly further includes a temperature sensor) and remaining battery capacity information. The fact that the cap assembly 24 only records a dispensing event when the correct voltage change $V_C$ is detected reduces false positives and improves accuracy of the data saved into the memory 56. The microprocessor 54 may also be configured to record data into the memory 56 when non-dispensing events occur, such as if the gate 36 is opened but no medication 26 is detected in the passage 46. In one embodiment, data is recorded onto the memory 56 each time the gate 36 is opened for more than a predetermined time threshold (such as two seconds).

In another embodiment, the medication sensors 48 are photoreflective diffuse sensors that are configured to sense a break in a path of light from the light source 60 (also known as a sender or emitter) to the light detector 62 (also known as a receiver). Specifically, in an example embodiment, a far wall of the passage 46 opposite of the medication sensors 48 can be coated with a highly reflective coating such that, in a resting condition with the passage 46 being empty, a beam of light emitted from the light source 60 reflects off of the reflective coating and is sensed by a phototransistor of the light detector 62. In another example, the base line reading is the light reflecting off the opposite wall and returning to the light detector 62; the wall is merely the polymer that forms the opposite wall. The opposite wall can be a smoothed polymer. When a medication 26 travels through the passage 46 either into or out of the receptacle 22, one or more of the medication sensors 48 are triggered by a breakage of the path of this beam of light. In an example embodiment, the medication sensor 48 can work by ambient light in the passage 46, e.g., detecting a change in the light sensed reflected in the passage 46. Such an event with either of the medication sensors 48 is interpreted by the microprocessor 54 as a positive confirmation that medication 26 has either passed into or out of the receptacle 22. The number of medication sensors 48 may be dictated by the sizes and shapes of the medications 26 that will be contained in the medication container 20 with more medication sensors 48 being preferred for smaller medications 26 to ensure that any medications 26 travelling through the passage 46 break at least one of the light beams. The light beams emitted by the light sources 60 may be in the infrared range such that the light beams are invisible to the human eye. In another embodiment, the medication sensors 48 are of the type that are capable of sensing the breakage of a beam of light from the light source 60 without the need for the reflective coating on the far wall of the passage 46.

In yet another embodiment, the medication sensors 48 include imagers, e.g., cameras, which are configured to capture image of the medications 26 traveling through the passage 46 and communicate those images to the microprocessor 54. The microprocessor 54 can then automatically confirm that the medication 26 is the correct type of medication 26 by scanning the image for a size, shape, and color match and for an etching or other indicia on the medication 26. This improves medication compliance by positively confirming that each dispensing event recorded to the memory is for the correct medication 26 and not an error. The image may be stored in the memory 56 of the cap assembly 24 and ultimately uploaded to the external device 28 via the wireless module 52, as discussed in further detail below.

In an example embodiment, the medication sensor 48 can work by ambient light in the passage 46, e.g., detecting a change in the light sensed reflected in the passage 46 when a medication 26 enters the passage 46. In this embodiment, there is no light source 60 to illuminate the passage 46.

In another example embodiment, the medication sensors 48 include signal emitters 60 (in place of light sources), and the detectors 62 can detect the signals. The signal emitters 60 can emit an ultrasonic signal that is sensed by the detectors 62. In an example, the emitters are RF emitters and the detectors detect change in the emitted signal. The associated circuitry can detect the presence of a medication 26 in the passage 46 by a phase shift in the signal or a time shift in the signal received versus the signal emitted.

In an example embodiment, the medication sensors 48 can include detection circuitry to detect when a medication 26 passes into the passage 46. The detection circuitry can detect the change in light, sound source, radio frequency (RF) signal or the like to determine passing of one or more medications 26 past the medication sensor 48 in the passage 46.

In yet another example embodiment, each medication sensor includes a camera and a light source, and the opposite wall of the passage has the at least one concave mirror. In operation, the light source projects light against the concave mirror, which reflects and focuses the light onto the camera. The camera takes images of any medications travelling through the passage to detect medications travelling through the passage. The images captured by the camera can be analyzed by the microprocessor to confirm that the medications contained therein are the correct medications.

The accelerometer 50 is in electrical communication with the microprocessor 54 and is configured to sense movement of the cap assembly 24, such as opening or closing of the gate 36 or a tilting of the medication container 20. In the first embodiment, the microprocessor 54 is configured to put the electrical components in the cap assembly 24 in a low power (sleep) mode after a predetermined time wherein the accelerometer 50 senses no or little movement, thus preserving power and extending battery life. For example, the microprocessor 54 could be configured to reduce or cut power to all of the electronic components in the cap assembly 24 except itself and the accelerometer 50 when the accelerometer 50 fails to sense any movement for a half-minute, one minute, two minutes, three minutes or the like. When the cap assembly 24 is in the low power mode, the microprocessor 54 is configured to immediately activate the electrical components in response to the accelerometer 50 detecting movement and providing an "ON" signal to the microprocessor 54.

In an embodiment, the accelerometer 50 also is configured to sense an orientation of the medication container 20 so that the microprocessor 54 can determine whether a trigger event by the medication sensors 48 is the travel of a medication 26 into or out of the receptacle 22. Specifically, if the accelerometer 50 senses that the medication container 20 is upside down or is angled downwardly at the time when one or more of the medication sensors 48 are triggered, then this indicates that a medication 26 has been poured out of the receptacle 22, and the microprocessor 54 records the event in the memory 56 as a medication leaving the receptacle. Conversely, if the accelerometer 50 senses that the medication container 20 is in an upright or an upwardly angled orientation at the time when one or more of the medication sensors 52 are triggered, then the microprocessor 58 logs the event as a medication 26 being inserted into the receptacle 22.

The wireless module 52 is configured to transmit and receive data with the external device 28 (such as a smart phone, a tablet, a personal computer, a smart watch, a dedicated unit, server, or any suitable type of electronic device) either directly or via the internet 64. The wireless module 52 could be configured to communicate with the external device 28 via one or more of Bluetooth®, WiFi®, near field communications (NFC®), cellular communication, or any suitable wireless protocol or protocols. In an embodiment, the wireless module 52 is configured to communicate with the external device 28 via cellular communication channels, thereby eliminating the need for the user to pair or otherwise set up direct communication between the cap assembly 24 and the external device 28 and allowing the data to be uploaded to the external device 28 even when the external device 28 is not in the proximity of the cap assembly 24. Depending on the region, the wireless module 52 may be configured to communicate using Narrowband IoT and/or LTE-M technology. The external device 28 may also be a smart speaker that can allow a user to check if they have already taken their medication 26 or which can remind the user when to take their medication 26. The external device 28 may further be a cloud accessible database which can store all of the data as a backup in the event that the cap assembly 24 is lost or damaged.

The wireless module 52 and the external device 28 can be configured to encrypt and verify all data communication therebetween, regardless of the form of wireless communication. The memory 56 can store at least the data which is to be transferred to the external device 28 so that this data is not lost if medication 26 is either added to or removed from the medication container 20 when the wireless module 52 is not in active communication with the external device 28. In other words, when the wireless module 52 is not actively in communication with the external device 28, the cap assembly 24 can operate as a stand-alone unit, which stores data internally until that data can be uploaded to the external device 28. The memory 56 may also contain data for an updatable medication count for the medication container 20. The medication count may be initially set by a pharmacy that fills the medication container 20 or by the user. The memory 56 is preferably of the non-volatile type such that the data stored thereon is not lost in the event of a power failure.

The battery 58 is mounted on the electronics substrate 44 and is electrically connected with all of the electronic components to power these components. The battery 58 could be designed to be easily replaced to allow for re-use of the medication container 20 or the medication container 20 could be disposable such that it, along with the battery 58, is to be recycled after the medication 26 contained therein has been taken. In alternate embodiments, the cap assembly could include a plurality of batteries and the battery or batteries could be rechargeable via a recharging port on the cap assembly. The battery 58 or batteries may be provided with only enough charge (plus a safety factor) to last until the medication 26, which is initially placed in the receptacle 22, is to be either discontinued according to prescription instructions or runs out. The battery 58 could be configured for wireless charging.

The cap assembly 24 itself and/or the external device 28 is may be configured to monitor the medication count and alert a pharmacy to trigger an automatic refill when any of the medication counts passes a predetermined threshold, e.g., four days of supply.

The cap assembly 24 and/or the external device 28 may also be configured to automatically alert a user when it is time for the user to take the medication 26. In some embodiments, a medication schedule is programmed into the memory 56, and the microprocessor 54 is configured to alert the user each time the user is to take a dosage of the medication 26 according to the medication schedule. The timing of the alert could be manually changed by a user and/or could be remotely changed by either the pharmacy or a doctor via the external device 28. The alert could be, for example, a notification displayed on or broadcast by the external device 28. In the exemplary embodiment, the cap assembly 24 further includes an alert means in the form of a light 66 (such as an LED) which can visually communicate with the user by, for example, changing colors or flashing at different rhythms. The light 66 may, for example, alert the user when it's time to take the medication 26 according to the dispensing schedule or to charge the battery 58.

As discussed above, the external device 28 and/or the memory 56 are programmed to maintain a continuously updated record of each positive confirmation of medication 26 leaving or entering the receptacle 22 through the passage 46 and display that record when prompted by the user or a medical provider (such as a doctor). Thus, in the event that a user is unsure if the medication 26 the user can check the record to determine if the medication 26 was removed. The medical provider may then use the record to determine if the user is properly following a prescribed medication schedule. This improves medication adherence by eliminating doubt for both the user and the medical provider without the user having to take any additional steps, such as writing down the time each medication 26 was taken. The app may also communicate with a remote, cloud-based database via internet protocols, which maintains a copy of the medication count and the records. This advantageously allows the user, the medical provider, and/or a pharmacy to access the data from different devices and also ensures that the data is not lost if the user loses or otherwise damages the external device 28.

The cap assembly 24 can be assembled separately from the receptacle 22 and is only joined with the receptacle 22 after the medications 26 have been inserted into the receptacle 22, for example, at a pharmacy. The memory 56 may be initially programmed to include data related to the medications 26 either before or after the cap assembly 24 is joined with the receptacle 22.

Figure 8:
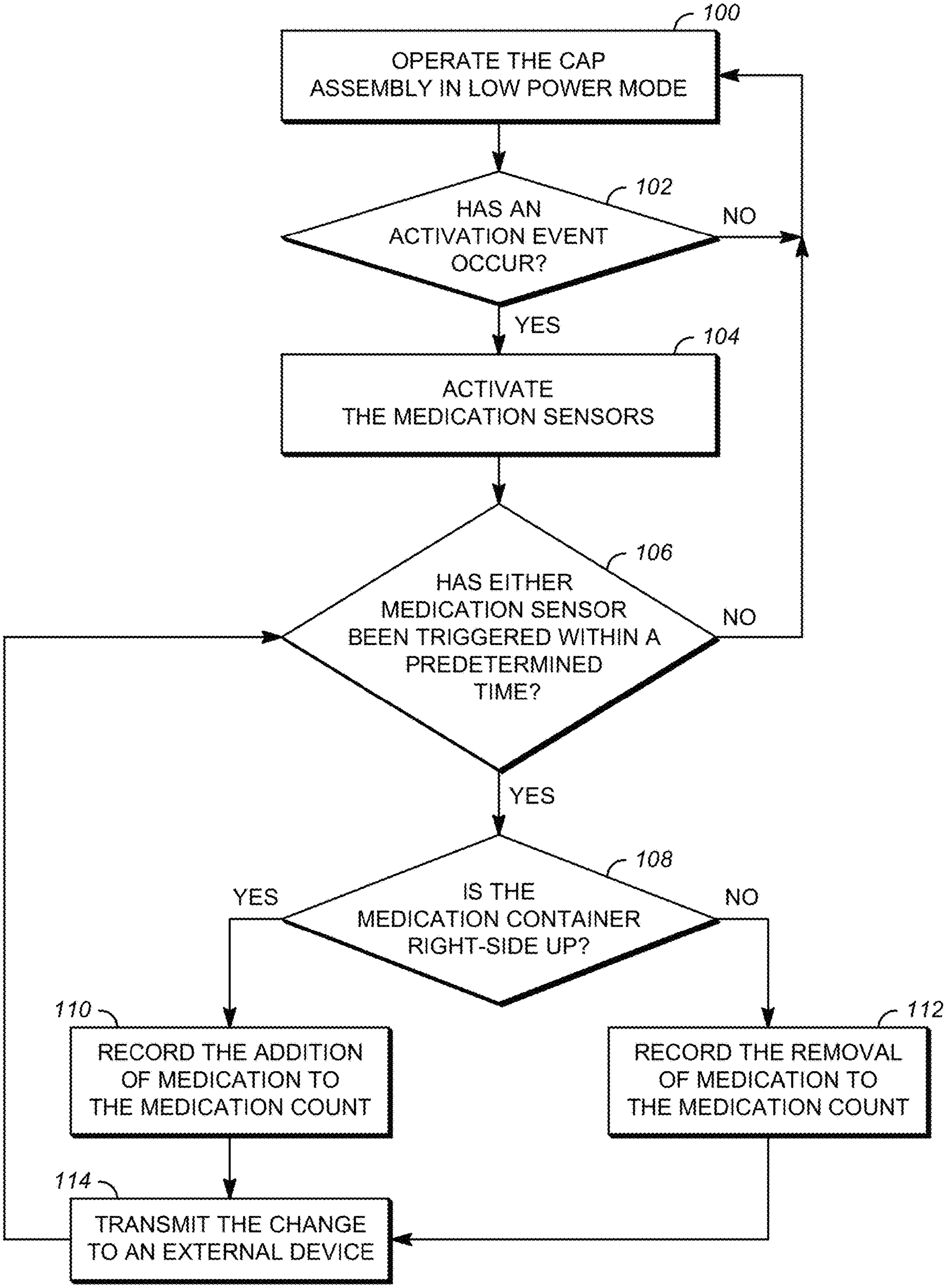
FIG. 8 is a flow chart illustrating the steps of a method according to one aspect of the present disclosure.

Operation of an exemplary embodiment of the medication container 20 is discussed below with reference to the flow chart of FIG. 8. The method starts at step 100 with the cap assembly 24 operating in the low power mode whereby all of the electronic components, except the accelerometer 50 and the microprocessor 54, are deactivated. At decision step 102, the cap assembly 24 determines if an activation event has occurred, such as the accelerometer 50 sensing movement of the medication container 20 or the gate 36. If the answer to step 102 is no, then the method returns to step 100. If the answer to step 102 is yes, then the method proceeds to step 104. At step 104, the microprocessor 54 activates the medication sensors 48, the wireless module 52, and the memory 56. In another embodiment that has an on/off switch, all of the electrical components, including the microprocessor and the accelerometer, could be off when the cap assembly is in the low power mode and only activated when the switch is moved to the "on" position.

At decision step 106, the microprocessor 54 determines if one or more of the medication sensors 48 has been triggered within a predetermined period of time, e.g., one minute. If the answer at step 106 is no, then the method returns to step 100. If the answer to step 106 is yes, then the method proceeds to decision step 108. At decision step 108, the microprocessor 54, based on data from the accelerometer, determines if the medication container 20 is right-side up. If the answer at decision step 108 is yes, then the method proceeds to step 110. At step 110, the microprocessor 54 records the addition of medication 26 to the medication count. If the answer at decision step 108 is no, then the method proceeds to step 112, then the microprocessor 54 records the removal of medication 26 to the medication count. After either step 110 or 112, the method proceeds to step 114, and the change in the medical count is communicated via the wireless module 52 to the external device 28 or saved to the memory 56 for later uploading to the external device 28.

Figure 9:
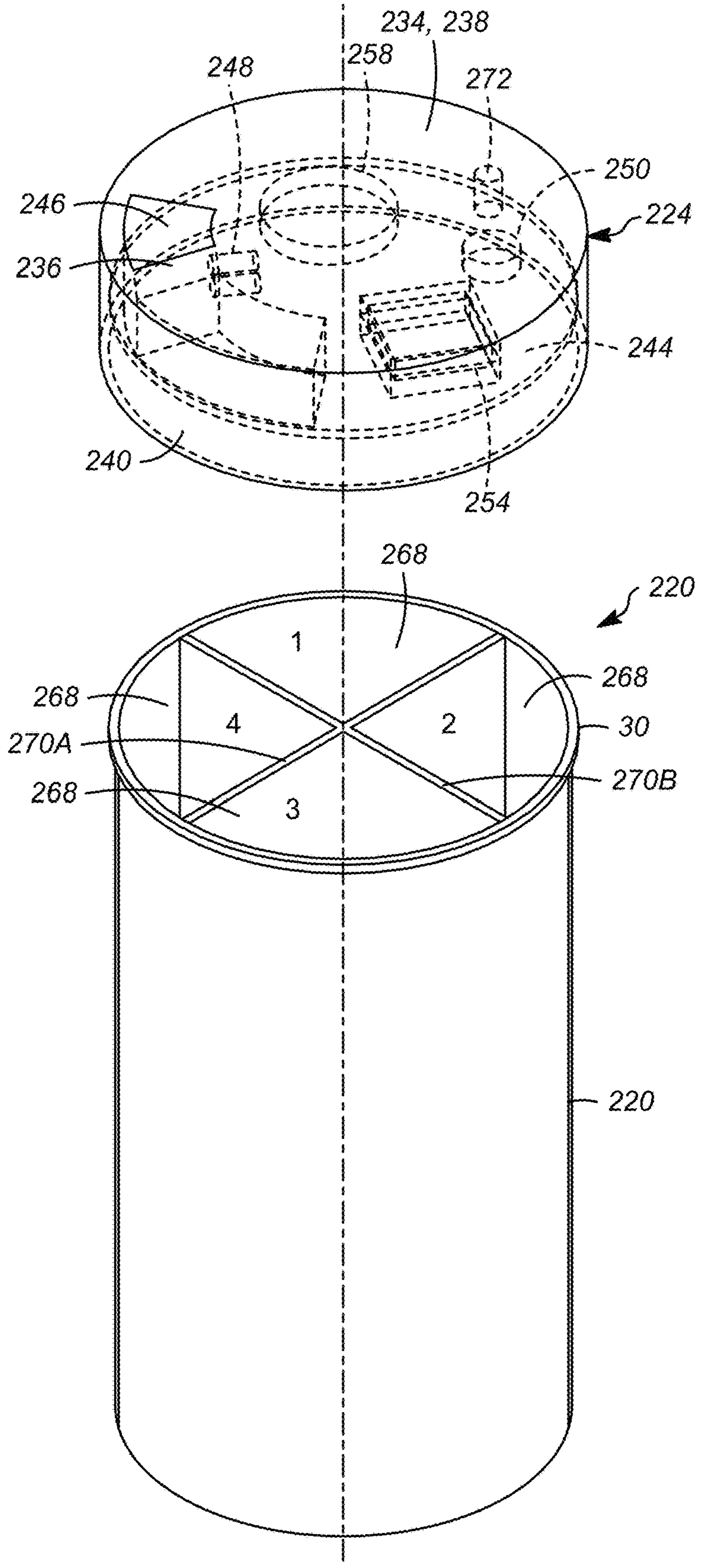
FIG. 9 is a perspective and partially exploded view of a second embodiment of a medication container.
Figure 10:
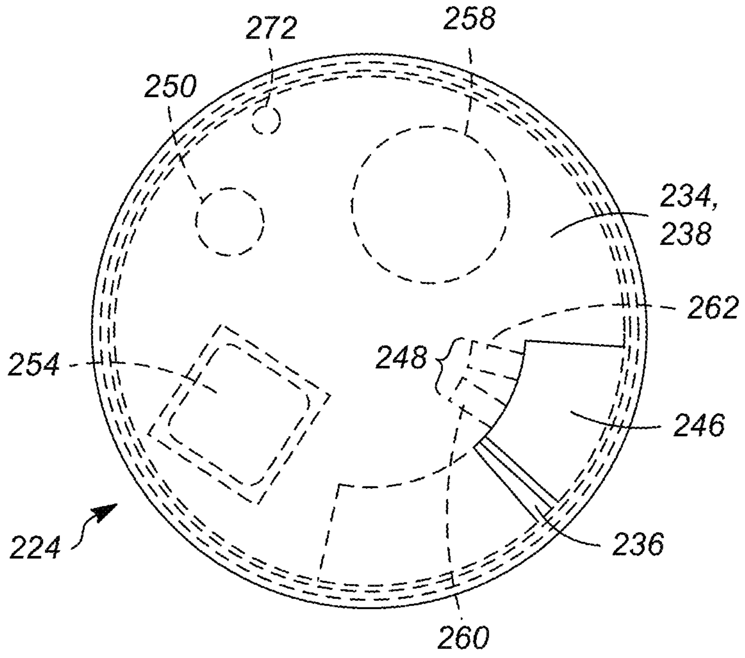
FIG. 10 is a top schematic view of the medication container of FIG. 9.

Referring now to FIG. 9, a second embodiment of the medication container 220 is generally shown with like numerals, separated by a prefix of "2", indicating corresponding parts with the first embodiment described above. The second embodiment is distinguished from the first embodiment by the inside of the receptacle 222 being provided with multiple chambers 268 for simultaneously storing different medications (such as pills, tablets, gel caps, capsules or the like, e.g., non-liquid medicines) within the same receptacle 222. The chambers 268 are defined by at least one wall 270*a*, 270*b*. Specifically, in the exemplary embodiment, the receptacle 222 includes two walls (a first wall 270*a* and a second wall 270*b*) which extend diametrically across the inner space, from opposing positions at an outer wall of the receptacle 222, and perpendicularly to one another to divide the inner space into four equally shaped and sized chambers 268. In an example embodiment, the first wall 270*a* and the second wall 270*b* extend to the top of the outer wall. In an example, the top ends of the outer wall, the first wall 270*a*, and the second wall 270*b* are co-planar. The chambers 268 define sub-spaces between parts of the outer wall, the first wall 270*a* and the second wall 270*b*. The chambers 268 are designed to receive the medications in a loose configuration, i.e., not structurally organized, through the open top, and to store medications therein before dispensing the individual ones of the medications. In some embodiments, the receptacle includes only one wall or three or more walls to divide the inner space into any suitable number of chambers, and those walls could be arranged so that the chambers have either similar or differing shapes and sizes.

An outer surface of the receptacle 222 may include indicia associated with the chambers 268 which could, for example, identify the respective chambers 268 with numbers (for example, "1", "2", etc.) or which could identify which medications are contained in the chambers 268. Identifiers other than numbers may also be used to identify individual chambers 268.

In the second embodiment, the cap 234 is loosely fit onto the receptacle 222 such that the cap assembly 224 can rotate relative to the receptacle 222 while remaining connected therewith with little force being required. The cap assembly 224 preferably includes a rotation restriction means, which only allows the cap assembly 224 to rotate relative to the receptacle 222 in one rotational direction (either clockwise or counter-clockwise) and restricts rotation in the opposite direction. In an example embodiment, the cap assembly 224 can include a first part fixed to at the top, open end of the receptacle 224 and a second part on the first part, with the second part being rotatable on the first part.

The passage 246 has a cross-sectional area that is sized no greater than a cross-sectional area of the largest of the chambers 268 in the receptacle 222 to ensure that only the medication in the chamber 224 that is aligned with the passage 246 can travel through the passage 246 and out of the medicine container 226, i.e., all of the other chambers 268 remain closed by the cap assembly 224. In an example embodiment, the largest dimension of the passage 246 is equal to or less than the largest, cross-sectional dimension of the chamber 268. The chamber 268 which is, at any given moment or position of the cap 236, aligned with the passage 246 is hereinafter referred to as the "selected chamber". In the first exemplary embodiment, the passage 246 has a similar shape and size as each of the four equally sized chambers 268. In an example embodiment, the passage 246 has a similar shape and size as an outer portion of the chambers 246, e.g., adjacent the outer wall of the receptacle 222.

The cap assembly 224 further includes an electronic position sensor 272, which can monitor a rotational position of the cap assembly 224 relative to the receptacle 222 to determine which of the chambers 268 is the selected chamber aligned with the passage 246. In an example embodiment, the position sensor 272 is another photoreflective sensor that projects light through an opening in the electronics substrate 244 and into the inner space of the receptacle 222. The top edges of the first and second walls 270*a*, 270*b* are provided with a highly reflective coating. The photoreflective position sensor 272 is triggered not by a break in the light beam but by the opposite, i.e., the light beam being reflected off of the highly reflective coating on the first and second walls 270*a*, 270*b* and back to the phototransistor when the cap assembly 224 is rotated until the position sensor 272 passes over one of the first and second walls 270*a*, 270*b*. In response to this trigger event, the microprocessor 254 updates which chamber 268 in the receptacle 222 is the selected chamber. In alternate embodiments, the position sensor could take a range of different forms other than that of a photoreflective sensor. For example, the position sensor could be a magnetic sensor, and the receptacle could include a plurality of magnets in precise locations, such as on the first and second walls. In such an embodiment, the microprocessor would determine which chamber the passage is aligned with based on the interactions between the position sensor and the magnets at the walls and associated with the chambers. In an example embodiment, the position sensor includes a capacitive sensor that senses the position of the cap relative to the container. In another embodiment, the position sensor is a diffuse sensor that can sense the breakage of a beam of light without the need for a reflective coating.

Figure 11:
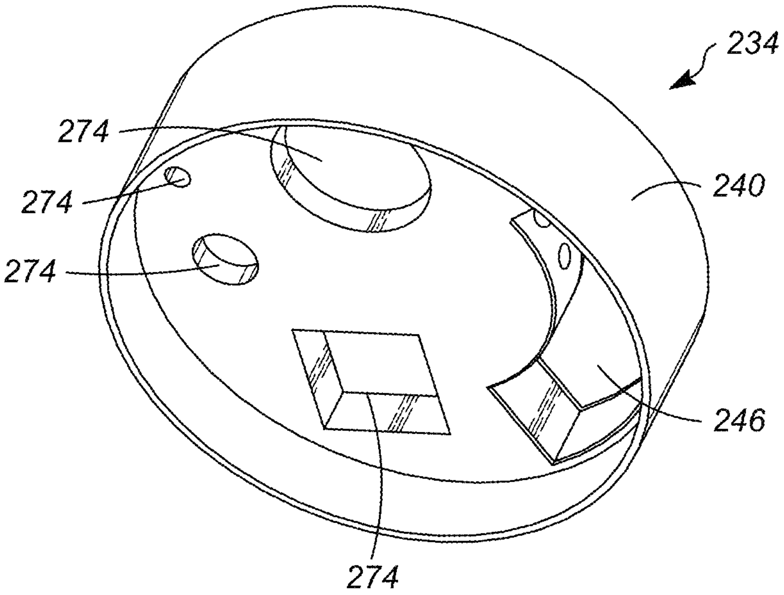
FIG. 11 is a perspective view of a cap of the medication container of FIG. 10.

Referring now to FIG. 11, in the second exemplary embodiment, a lower (inner) surface of the cap 234, which includes a plurality of recesses 274 formed into it for accommodating the electrical components of the cap assembly 224. The presence of the recesses 274 improves the durability of the cap assembly 224 by protecting the electrical components.

Figure 12:
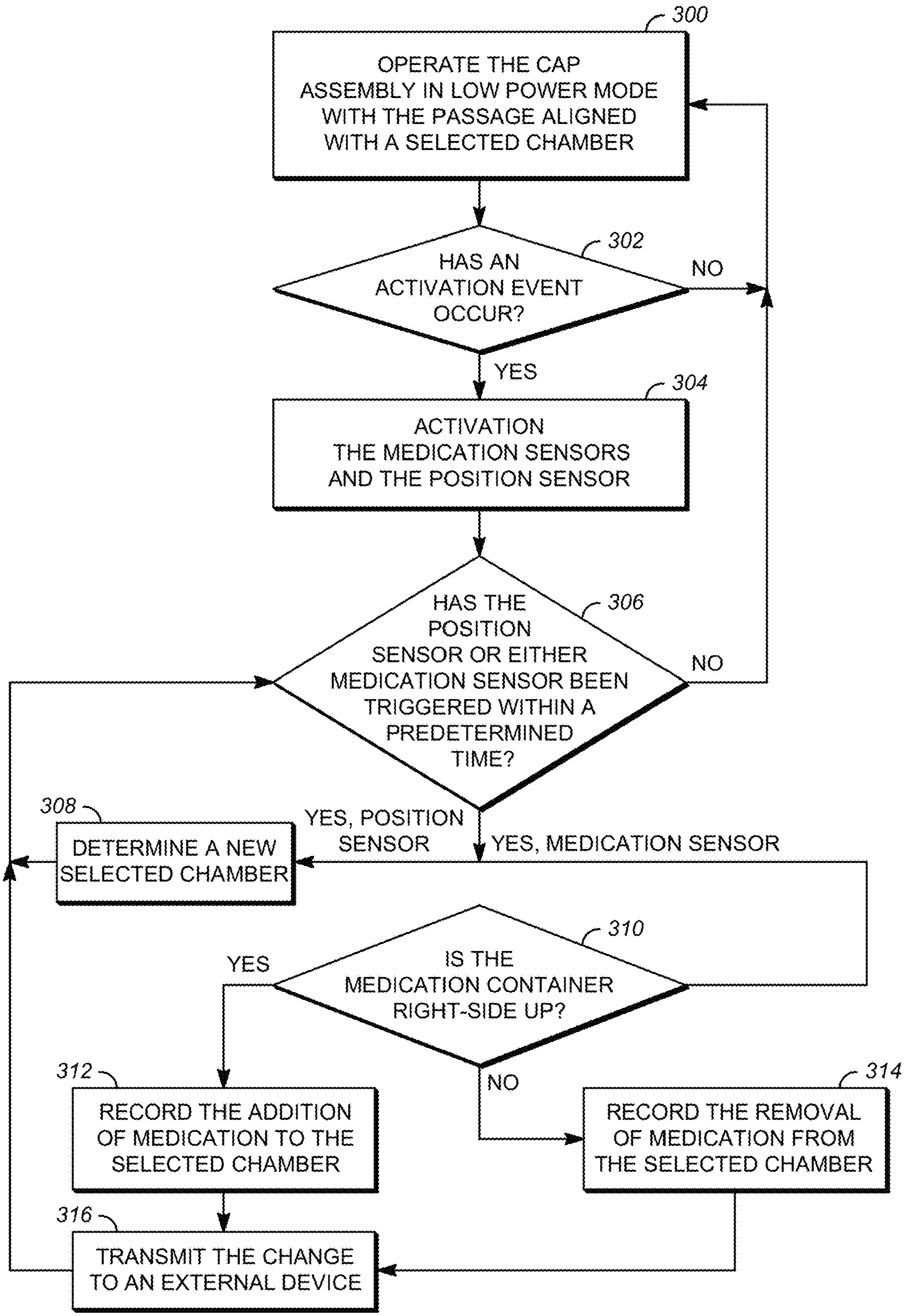
FIG. 12 is a flow chart illustrating the steps of a method according to an aspect of the present disclosure.

Operation of an exemplary embodiment of the medication container 220 is discussed below with reference to the flow chart of FIG. 12. The method starts at step 300 with the cap assembly 224 in a known rotational position relative to the receptacle 222 such that the passage 246 is aligned with a selected chamber that is known by the microprocessor 254. The cap assembly 224 starts in the low power mode whereby all of the electronic components, except the accelerometer 250 and the microprocessor 254, are deactivated to preserve the life of the battery 258. At decision step 302, the microprocessor 254 determines if the accelerometer 250 senses movement. If the answer at decision step 302 is no, then the method proceeds back to step 300. If the answer at step 302 is yes, then the method proceeds to step 304. At step 304, the microprocessor 254 activates the position sensor 272, the medication sensors 248, and the wireless module 252. In another embodiment that has an on/off switch, all of the electrical components, including the microprocessor and the accelerometer, could be off when the cap assembly is in the low power mode and only activated when the switch is moved to the "on" position.

At decision step 306, the microprocessor 254 determines if either the position sensor 272 or one of the medication sensors 248 has been triggered within a predetermined period of time, e.g., one minute. If the answer at decision step 306 is no, then the method proceeds back to step 300. If the answer at decision step 306 is yes for the position sensor 272, then the method continues with step 308 wherein the microprocessor 254 determines a new selected chamber. Because the cap assembly 224 is only configured to rotate relative to the receptacle 222 in one rotational direction, the microprocessor 254 determines the new selected chamber by indexing the selected chamber stored in the memory 256 to the next sequential one of the chambers 268. In an embodiment where the cap assembly is able to rotate in both rotational directions, then the position sensor and receptacle are provided with a chamber identification means which is configured to identify which new chamber the passage becomes aligned with and that chamber is stored in the microprocessor as the new selected chamber. Once the new selected chamber has been determined, then the method proceeds back to decision step 306.

If the answer at decision step 306 is yes for one or both of the medication sensors 245, then the method continues to decision step 310. At decision step 310, the microprocessor 254 (with input from the accelerometer 250) determines if the medication container 220 is right-side up (or angled upwardly). If the answer at decision step 310 is yes, then at step 312, the microprocessor 254 records the addition of medication to the selected chamber into the memory 256. If the answer at decision step 310 is no (i.e., the medication container 220 is upside down), then at step 314, the microprocessor 254 records the removal of medication from the selected chamber to the memory 256.

Following either of step 312 or 314, at step 316, the wireless module 252 transmits to the external device 228 data related to the change (either addition or subtraction) in medication count. If the wireless module 252 is not in communication with the external device 228 at the time of the change, then the change can be stored in a memory 256 and transmitted to the external device 228 upon the next establishment of communication between the wireless module 252 and the external device 228.

The second embodiment improves medication compliance by allowing the user to both store a quantity of different types of medications in the single, easily transportable medication container 220 and to monitor the passage of all of those types of medications out of the medication container 220. This embodiment can also allow the individual detection of medications in the respective passage 246.

Figure 13:
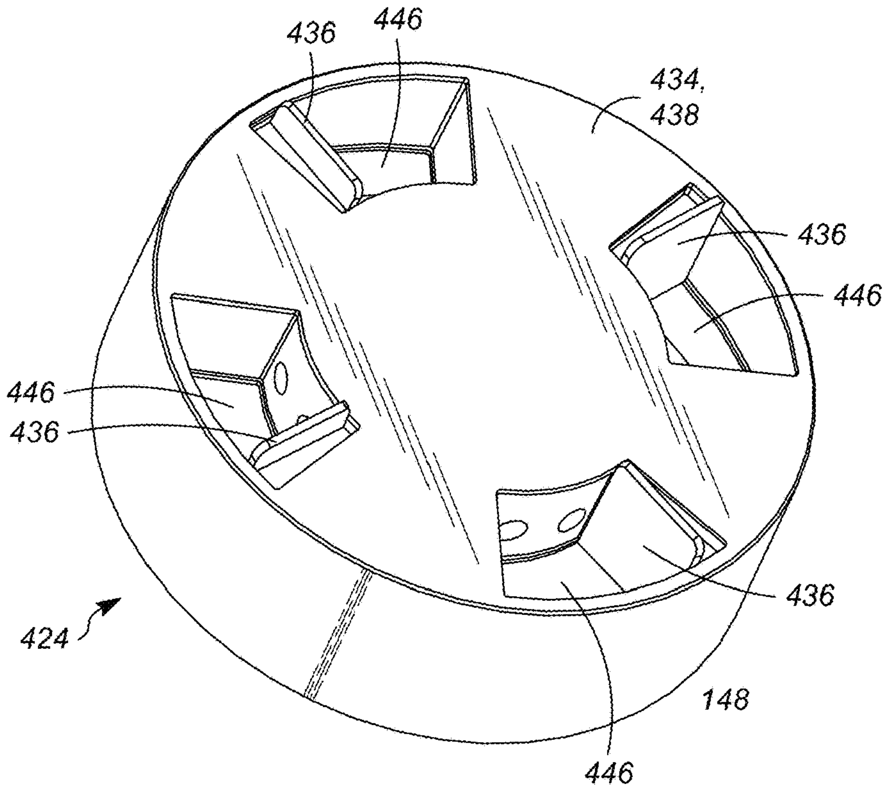
FIG. 13 is a perspective view showing a cap assembly constructed to another exemplary embodiment.
Figure 14:
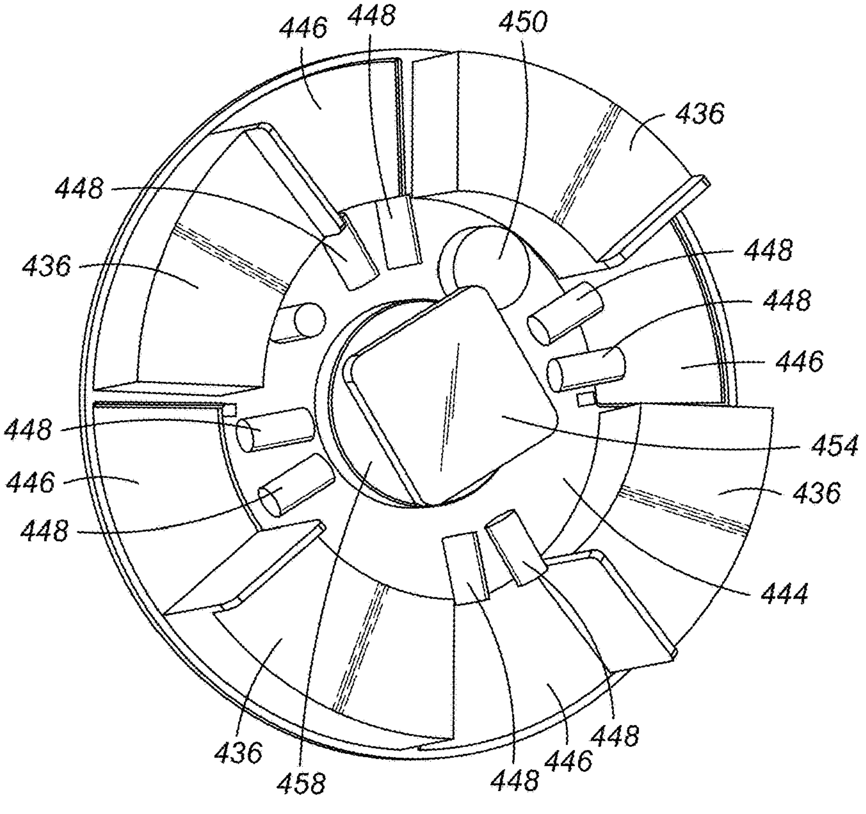
FIG. 14 is a perspective view showing the cap assembly of FIG. 13 with an inner wall of the cap assembly being removed.

Referring now to FIGS. 13 and 14, another exemplary embodiment of the cap assembly 424 is generally shown with like numerals, separated by a prefix of "4" identifying corresponding components with the exemplary embodiments described above. This embodiment is distinguished from the second exemplary embodiment by the cap assembly 426 being fixed (non-rotatable) with the receptacle 222 (shown in FIG. 9) and by the cap 434 including separate passages 446 and separate gates 436 for each of the chambers. Thus, to access a desired medication, a user opens the gate 436 associated with the chamber which contains a desired medication. The cap assembly 424 includes a pair of medication sensors 448 for each of the passages 446. Thus, the cap assembly 424 has a total of eight medication sensors 448 to go with the four passages 446. Because the cap assembly 424 does not rotate relative to the receptacle the position sensor found in the second embodiment is absent. The cap assembly 424 further includes a plurality of gate sensors 476 (two being visible in FIG. 14) that are located adjacent the passages 446 (shown in FIG. 13). As discussed in further detail below, the gate sensors 476 are configured to detect whether the respective gates 436 are in the open or closed positions. In this embodiment, a positive confirmation that medication has travelled through the passage 446 is only logged by the microprocessor 450 if both one of the gate sensors 476 detects that the gate 436 is in an open position and a respective one of the medication sensors 448 is triggered. The gate sensors 476 can either be proximity sensors or switches and may be triggered through any suitable means, e.g., magnetic, mechanical, light, etc. For example, in some embodiments, the gate sensors 476 are photovoltaic sensors, which are configured to detect light reflecting off of a reflective coating (not shown) which is located on the gate 436.

In some embodiments, the microprocessor 454 can be configured to only activate the medication sensors 448 in response to the gate sensor 476 associated with the respective passage 446 detecting that the adjacent gate 436 is in the open position. In other words, only the medication sensors 448 of the passage 446 with the open gate 436 are activated and the remaining medication sensors 448 remain in the low power mode.

Figure 15:
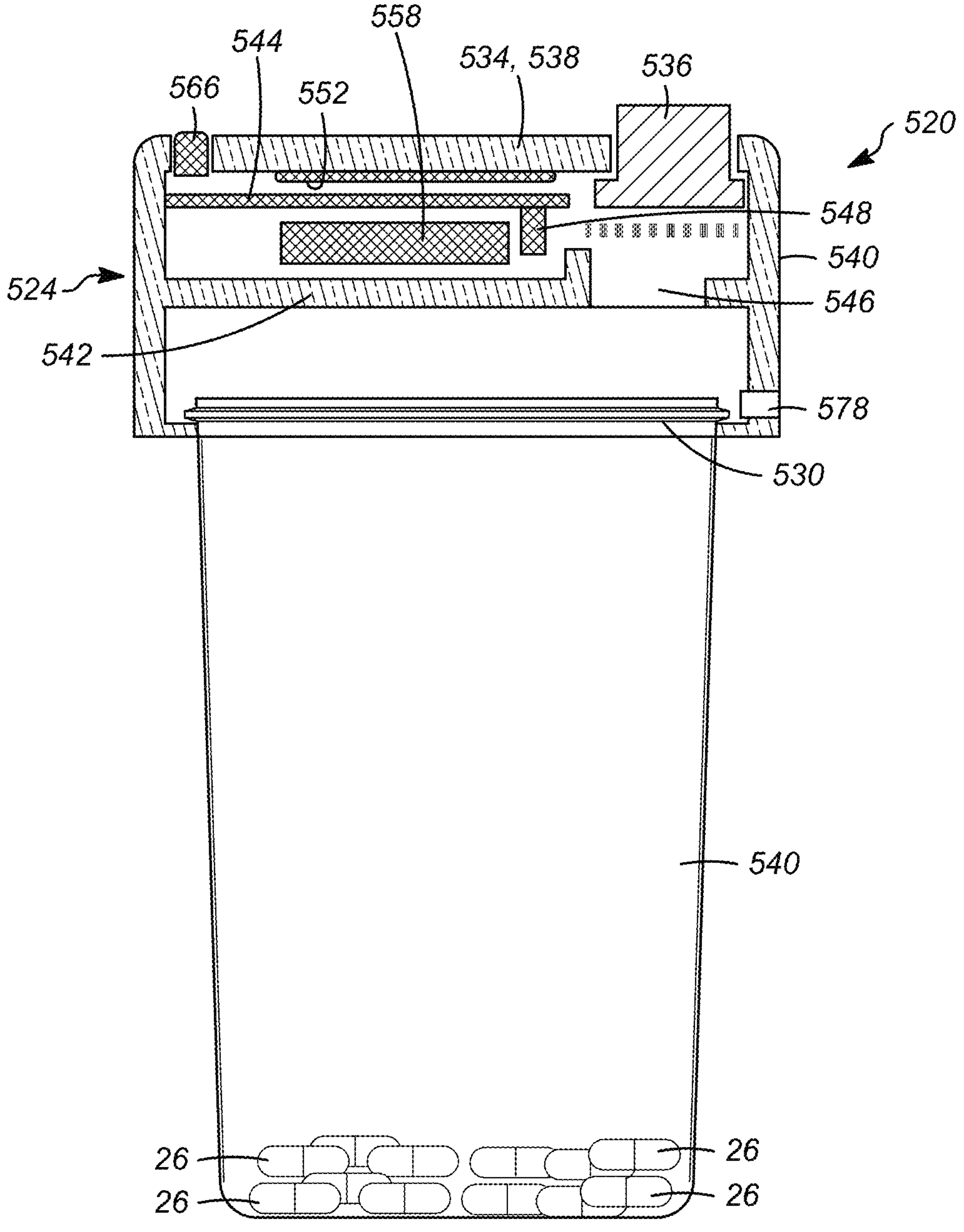
FIG. 15 is a cross-sectional view of yet another exemplary embodiment of the medication container.

Referring now to FIG. 15, yet another exemplary embodiment of the medication container 520 is generally shown with like numerals, separated by a prefix of "5", identifying corresponding components with the embodiments described above. The cap assembly 524 includes an attachment sensor 578 that is configured to detect if the cap assembly 524 is attached with or detached from the receptacle 522. The attachment sensor 578 is preferably a proximity sensor, which cooperates with the flange 530 of the receptacle 522 to positively confirm the attachment of the cap assembly 524. In some embodiments, the attachment sensor 578 is a photovoltaic sensor, which is configured to detect light reflecting off of a reflective coating (not shown) which is located on an outermost surface of the flange 530.

Figure 16:
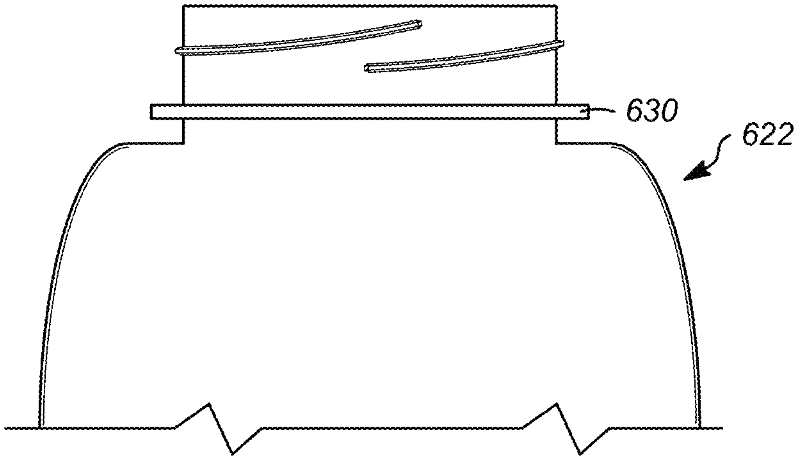
FIG. 16 is a front view of a receptacle which can be used with a cap assembly.

The attachment sensor 578 shown in FIG. 15 and discussed above may also be used in an alternate embodiment of a cap assembly (not shown) which has inner threads so that it can be threaded onto (as opposed to snap-fit onto) a bottle, such as the bottle 622 shown in FIG. 16. In this case, the attachment sensor 578 cooperates with the flange 530 located below the threads on the bottle 622 to positively confirm the attachment of the cap assembly with the bottle 622.

The attachment sensor 578 is in electrical communication with the microprocessor. In the event that the attachment sensor 578 detects that the cap assembly 524 has been detached from the receptacle 522, the microprocessor logs this event in the memory and/or uploads the event to the external device to inform the user that the cap assembly 524 is not properly attached. This data can also be used to inform the user that the count of medications in any chambers of the receptacle may no longer be accurate due to the removal event.

Figure 17:
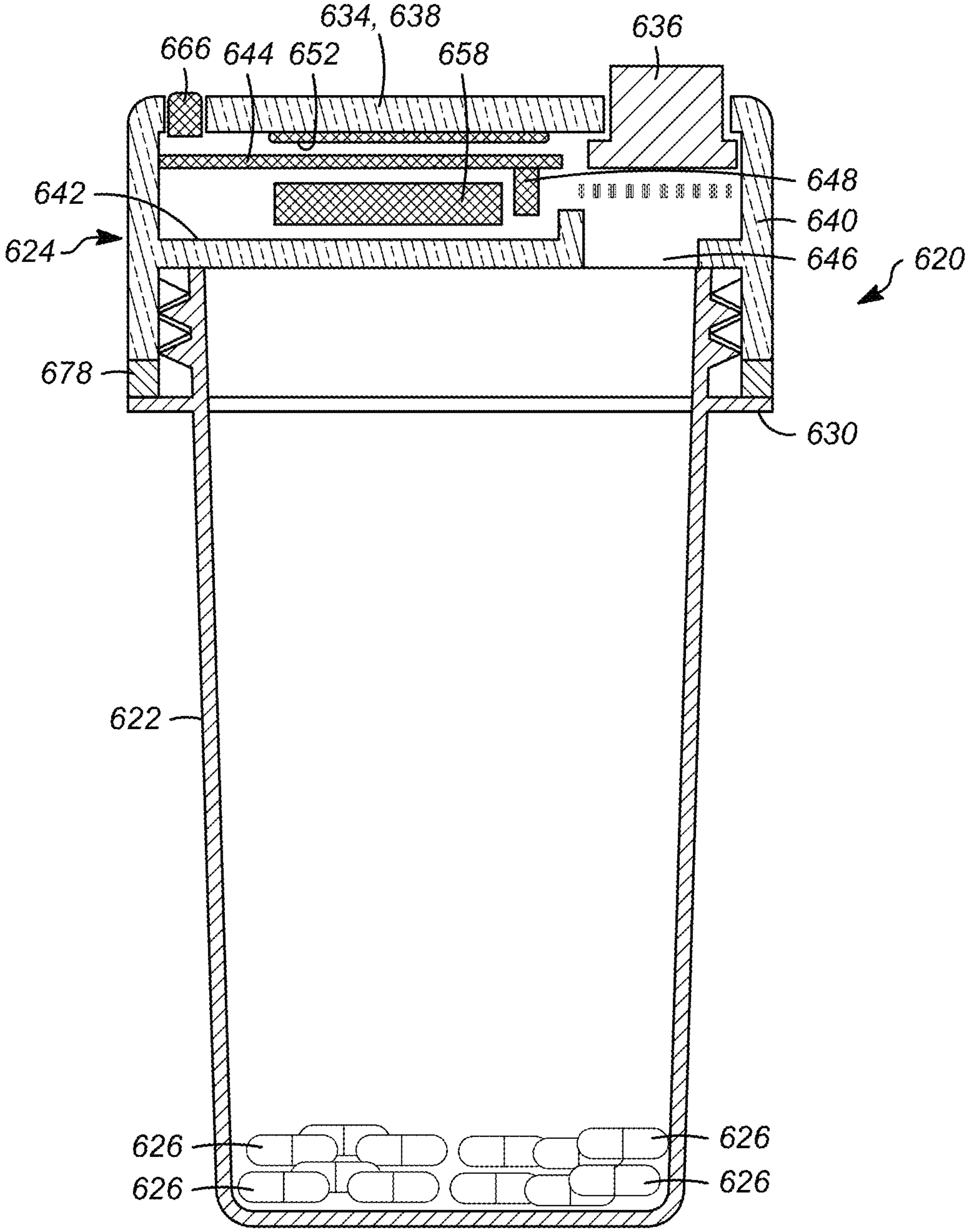
FIG. 17 is a cross-sectional view of a medication container constructed according to another aspect of the present disclosure.

Referring now to FIG. 17, still another exemplary embodiment of the medication container 620 is generally shown with like numerals, separated by a prefix of "6", identifying corresponding components with the embodiments described above. In this embodiment, the attachment sensor 678 is a pressure sensor which is located at a bottom rim of the cap assembly 624. The attachment sensor 678 is thus configured to be either be activated or deactivated in response to a pressure being applied to it. When the cap assembly 624 is joined with the receptacle 622, such as by threading the cap assembly 624 onto the threads of the bottle 622, the attachment sensor 678 is pressed against the flange 630 to trigger the attachment sensor 678 and positively confirm that the cap assembly 624 is properly attached with the receptacle 622. In the event that the cap assembly 624 is removed from the receptacle 622, the pressure applied to the attachment sensor 678 is relieved, thereby triggering the removal event.

Systems and methods described herein can determine whether and/or when a patient is taking the prescribed medication. The cap assembly 24 or the external device 28 can provide, when appropriate, reminders and/or alerts to the patient or patient representative to improve adherence to a medication regimen.

In some embodiments, the medication container includes an interface that can alert the user to environmental conditions that may compromise the integrity of the medication (e.g., temperature sensors determining that ambient temperature has exceeded a certain temperature, that a thermal budget has been used, or that the interior a chamber has exceeded a moisture level. The circuitry in the cap through its communications circuitry can electronically communicate with prescribing doctor's devices, pharmacy devices, insurance companies, pharmacy benefits management devices, and other parties that may be interested in prescription practices and adherence.

Referring back to the embodiment of FIGS. 1-8 (but applicable to all embodiments), the external device 28 may further include an app or computer program which is configured to communicate with the medication container 20 to allow the user to interact with the medication container 20. The app may be able to do any combination of the following functions: history tracking of medication events; provide reminders, such as through text messaging, E-mail, or through a phone call; provide caregiver support; select, download, and delete data; allow the user to provide feedback after each medication take; allow the user to request a refill; control a rewards program which gives the user rewards for following a medication schedule; and warn the patient when a medication schedule attempts to pair incompatible medications. Further, the app may work either when the external device 28 is or is not in communication with the medication container 20 and may allow the user to manually enter other medication taking events, such as if the medication container 20 is not working or such as for other medications than those contained in the medication container 20. The app may further integrate with an existing electronic health records (HER) platform to automatically populate those records with a medication history. This may reduce the number of steps needed by both the patient and the providers to set up a medication adherence program and limit mistakes from patients who self-enter their medication. In one embodiment, the external device 28 may be configured to pair with the medication container 20 by scanning a code (such as a quick response [QR] code) on the cap assembly 24.

Figure 18:
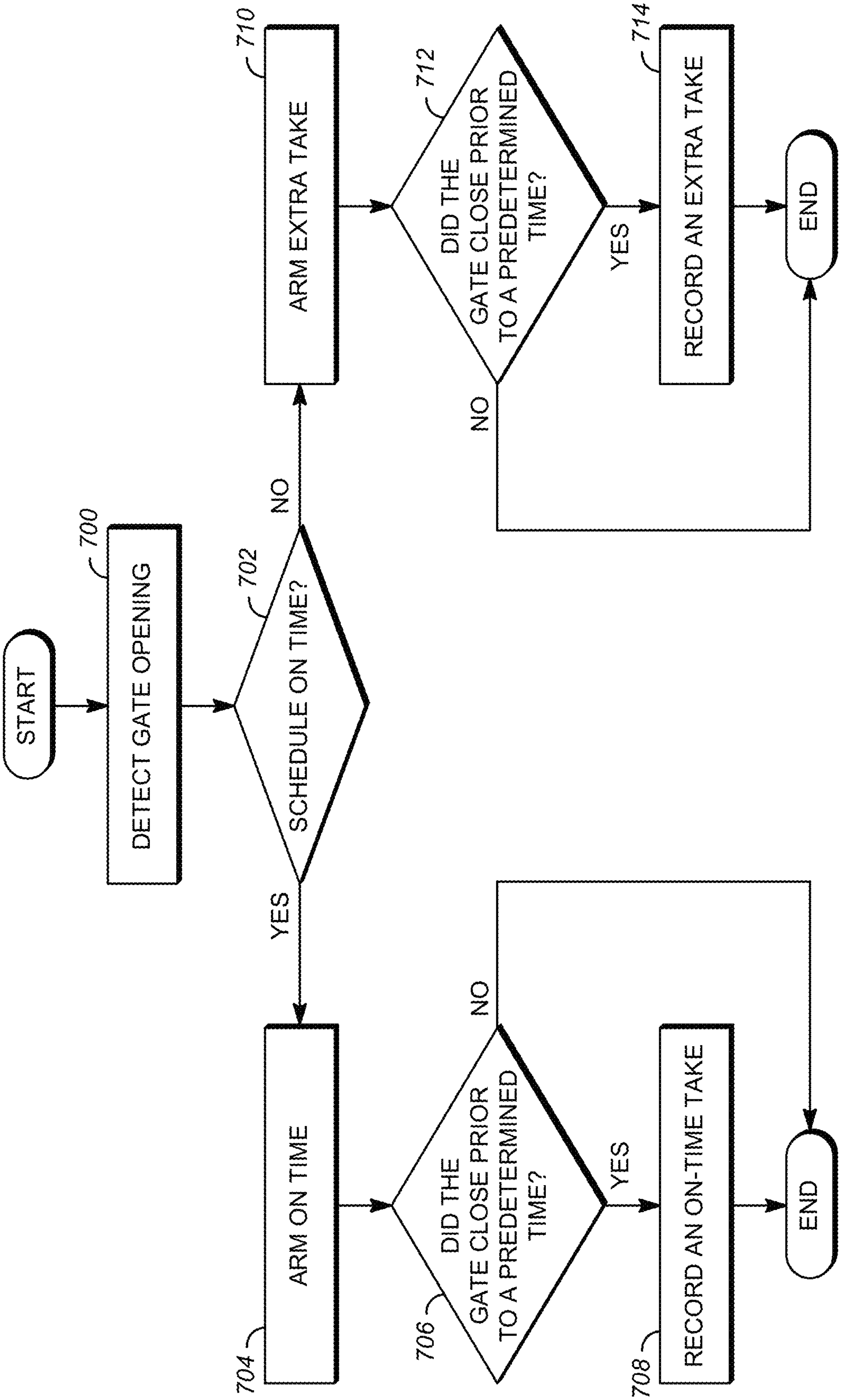
FIG. 18 is a flow chart illustrating the steps of a method according to an aspect of the present disclosure.

FIG. 18 is another flow chart depicting the steps of a method of operating a medication container, such as the medication container 20 shown in FIGS. 1-8, is generally shown. At step 700, the cap assembly 24 detects a gate 36 opening (in other embodiments, it may be the accelerometer 50 detecting movement or some other activation trigger event). At decision step 702, the cap assembly 24 determines if the gate 36 opening event occurred within a predetermined range (for example, thirty minutes) of a scheduled medication dosage event.

If the answer at decision step 702 is yes, then the method proceeds to step 704, and the cap assembly 24 arms itself for an on-time dosage event. At decision step 706, the cap assembly 24 determines if the gate 36 closed prior to a very short, predetermined time period, such as one second or two seconds. If the answer at decision step 706 is yes, then at step 708, the cap assembly 24 records an on-time take to the memory 56, and then the cap assembly 24 goes into standby mode and awaits another gate 36 opening event. If the answer at decision step 706 is no, then the cap assembly 24 goes into standby mode and awaits another gate 36 opening event.

If the answer at decision step 702 is no, then the method proceeds to step ↓710, and the cap assembly 24 arms itself for an extra take dosage event. At step 712, the cap assembly 24 determines if the gate 36 closed prior to a very short predetermined time period, such as one second or two seconds. If the answer at step 712 is yes, then at step 714, the cap assembly 24 records an extra take event to the memory 56, and then the cap assembly 24 goes into standby mode and awaits another gate 36 opening event. If the answer at decision step 712 is no, then the cap assembly 24 goes into standby mode and awaits another gate 36 opening event. If the gate 36 opened outside the predetermined window set forth in step 702, but no dosage event occurred within that window, then the following dosage event may be marked as being scheduled rather than an extra take.

The schedule programmed into the memory 56 of the cap assembly 24 may be a single day schedule, a weekly schedule, or a monthly schedule. The cap assembly 24 may also be configured to operate without any schedule programmed therein. In this condition, any dosage event recorded to the memory as being on time except if that dosage event occurs within a predetermined time (for example, one or two hours) of another dosage event. In that case, the second dosage event is recorded to the memory 56 as being an extra take.

The present disclosure refers to medications, e.g., pills, tablets, gel caps, capsules or the like. In various embodiments, the medications can be non-liquid medications such as individualized dose medications. The individual dose medications can be individually counted when they are dispensed from the receptacle past the medication sensor aligned with the passage. The medication, as in some embodiments, is a small, solid dosage form of a globular, ovoid, spheroid, or lenticular shape, containing one or more medical substances, supplemental substances, spices, or combinations thereof. The container and the cap are adapted to store these forms and prevent entry of environment into the interior of the medication container when closed by the cap assembly. The medication container is adapted to hold a plurality of the forms, e.g., ten, twenty, thirty, sixty, ninety, or multiples thereof.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A medication container, comprising
- a receptacle having an inner space for holding medications;
- a cap assembly coupled with said receptacle for retaining the medications in said inner space, said cap assembly including at least one passage that can be selectively opened and closed, and said cap assembly including at least one gate for selectively opening and closing said at least one passage and at least one gate sensor that is configured to detect if said gate is in an open position or is in a closed position;
- said cap assembly further including at least one medication sensor that is configured to detect any medications travelling through said passage and out of said receptacle in a contactless manner;
- a microprocessor in electrical communication with said at least one medication sensor and with a memory, said microprocessor being configured to record data to said memory in response to said at least one medication sensor detecting a medication traveling through said passage; and
- a wireless module in electrical communication with said microprocessor for uploading the data to an external device.

2. The medication container as set forth in claim 1 wherein said at least one medication sensor includes a light source and a light detector.

3. The medication container as set forth in claim 2 wherein said light detector produces a voltage when exposed to light and wherein said microprocessor is configured to monitor said voltage produced by said light detector to determine when a medication travels through said passage.

4. The medication container as set forth in claim 2 wherein said at least one medication sensor includes a plurality of medication sensors.

5. The medication container as set forth in claim 1 wherein said memory includes data pertaining to a medication count and wherein said medication count is updated with each detection by said at least one medication sensor of a medication travelling out of said receptacle.

6. The medication as set forth in claim 1 wherein said data recorded by said microprocessor to said memory further includes which chamber of said receptacle was said selected chamber when said at least one medication sensor detected the medication travelling through said passage.

7. The medication container as set forth in claim 1 wherein said wireless module is configured to communicate with the external device over cellular communication channels.

8. The medication container as set forth in claim 1 wherein said at least one passage of said cap assembly is only a single passage and wherein said cap assembly is rotatable relative to said receptacle for allowing a user to selectively align said passage with a desired one of at least two chambers of said receptacle.

9. The medication chamber as set forth in claim 8 further including a position sensor which is configured to detect which one of said at least two chambers of said receptacle is a selected chamber that said passage is aligned with and said position sensor being in electrical communication with said microprocessor.

10. A medication container, comprising:
- a receptacle having an inner space which is divided into at least two distinct chambers for holding different medications;
- a cap assembly operably coupled with said receptacle for retaining the medications in said at least two chambers;
- said cap assembly further including a single passage that can be selectively opened for allowing the medications in said at least two chambers to exit said receptacle and closed, and wherein said cap assembly is rotatable relative to said receptacle for allowing a user to selectively align said passage with a desired one of said at least two chambers of said receptacle;

said cap assembly further including at least one medication sensor that is configured to detect any medications travelling through said passage and out of said receptacle in a contactless manner;

a microprocessor in electrical communication with said at least one medication sensor and with a memory;

said microprocessor being configured to record data to said memory in response to said at least one medication sensor detecting a medication travelling through said at least one passage;

said data including at least a time stamp and an identification of which chamber of said at least two chambers the medication was located in;

a wireless module in electrical communication with said microprocessor for uploading the data to an external device; and a position sensor which is configured to detect which one of said at least two chambers of said receptacle is a selected chamber that said passage is aligned with and said position sensor being in electrical communication with said microprocessor.

11. The medication as set forth in claim 10 wherein said data recorded by said microprocessor to said memory further includes which chamber of said receptacle was said selected chamber when said at least one medication sensor detected the medication travelling through said passage.

12. The medication container as set forth in claim 10 wherein said at least one medication sensor is a photoreflective sensor.

13. The medication container as set forth in claim 10 wherein said at least one medication sensor is a diffuse sensor.

14. The medication container as set forth in claim 10 wherein said cap assembly further includes at least one gate for selectively opening and closing said at least one passage and further includes at least one gate sensor that is configured to detect if said gate is in an open position or a closed position.

15. The medication container as set forth in claim 10 wherein said cap assembly further includes an attachment sensor that is able to confirm attachment of said cap assembly with said receptacle.

16. A medication container, comprising:

a receptacle having an inner space for holding medications;

a cap assembly operable coupled with said receptacle for retaining the medications in said inner space, said cap assembly further including at least one passage that can be selectively opened and closed;

said cap assembly further including at least one medication sensor that is configured to detect any medications travelling through said passage and out of said receptacle and said at least one medication sensor being configured to operate in an active mode and in a low power mode;

a movement sensor disposed in said cap assembly and being configured to detect movement of said medication container; and a microprocessor in electrical communication with said at least one medication sensor and with said movement sensor and wherein said microprocessor is configured to operate said at least one medication sensor in a low power mode and to activate said at least one medication sensor in said active mode in response to said movement sensor detecting movement of said medication container.

17. The medication container as set forth in claim 16 wherein said movement sensor is an accelerometer.

18. The medication container as set forth in claim 16 further include a memory in said cap assembly and wherein said microprocessor is configured to record data to said memory in response to said at least one medication sensor detecting a medication travelling through said at least one passage; and said data including at least a time stamp and a quantity of medications that travelled through said at least one passage during a dispensing event.

19. The medication container as set forth in claim 18 further including a wireless module in said cap assembly and configured to communicate said data to an external device.

20. The medication container as set forth in claim 16 wherein said at least one medication sensor includes a light source and a light detector.

* * * * *